United States Patent
Zhu et al.

(10) Patent No.: US 12,392,753 B2
(45) Date of Patent: Aug. 19, 2025

(54) OPTICAL MICRORESONATOR ARRAY DEVICE FOR ULTRASOUND SENSING

(71) Applicant: DeepSight Technology, Inc., Los Altos, CA (US)

(72) Inventors: Jiangang Zhu, University City, MO (US); Lan Yang, Clayton, MO (US); Scott A. Miller, Ithaca, NY (US); Guangming Zhao, St. Louis, MO (US)

(73) Assignee: DeepSight Technology, Inc., Santa Clara, CA (US)

( * ) Notice: Subject to any disclaimer, the term of this patent is extended or adjusted under 35 U.S.C. 154(b) by 149 days.

(21) Appl. No.: 17/956,640

(22) Filed: Sep. 29, 2022

(65) Prior Publication Data

US 2023/0097639 A1    Mar. 30, 2023

Related U.S. Application Data

(63) Continuation of application No. PCT/US2021/022412, filed on Mar. 15, 2021.
(Continued)

(51) Int. Cl.
*G01N 29/12* (2006.01)
*G01N 29/06* (2006.01)
(Continued)

(52) U.S. Cl.
CPC ......... *G01N 29/12* (2013.01); *G01N 29/0654* (2013.01); *G01N 29/2418* (2013.01);
(Continued)

(58) Field of Classification Search
CPC .............. G01N 29/12; G01N 29/0654; G01N 29/2418; G01N 29/2437; G01N 29/2462;
(Continued)

(56) References Cited

U.S. PATENT DOCUMENTS 6,490,039 B2 * 12/2002 Maleki ................. H01S 5/1075
                                              372/98
6,795,481 B2 *  9/2004 Maleki ................. H01S 5/141
                                              372/92
(Continued)

FOREIGN PATENT DOCUMENTS

CN       1321888 A   11/2001
CN     101750280 A    6/2010
(Continued)

OTHER PUBLICATIONS

Gao et al., 10 kHz-34 MHz ultrasound detection based on a dual-core hybrid taper, APL Photonics, Nov. 13, 2019, p. 7 (Year: 2019).*
(Continued)

*Primary Examiner* — Stephanie E Bloss
*Assistant Examiner* — Kevin C Butler
(74) *Attorney, Agent, or Firm* — Kilpatrick Townsend & Stockton LLP

(57) ABSTRACT

An apparatus may include one or more optical fibers, one or more optical waveguides, and multiple resonator nodes arranged in an array of sensing locations. Each resonator node may include an optical coupling between an optical waveguide and an optical fiber having a set of resonant frequencies at a respective sensing location. Each resonator node may be further configured to communicate a set of signals corresponding to at least one shift in the set of resonant frequencies in the optical fiber at the respective sensing location.

22 Claims, 13 Drawing Sheets

Related U.S. Application Data

(60) Provisional application No. 63/001,738, filed on Mar. 30, 2020.

(51) Int. Cl.
   *G01N 29/24* (2006.01)
   *G02B 6/293* (2006.01)

(52) U.S. Cl.
   CPC ..... *G01N 29/2437* (2013.01); *G01N 29/2462* (2013.01); *G02B 6/29341* (2013.01); *G01N 2291/014* (2013.01); *G01N 2291/023* (2013.01)

(58) Field of Classification Search
   CPC ....... G01N 2291/014; G01N 2291/023; G02B 6/29341
   USPC ...................................................... 73/59, 579
   See application file for complete search history.

(56) References Cited

U.S. PATENT DOCUMENTS

| | | | | |
|---|---|---|---|---|
| 6,861,978 | B2* | 3/2005 | Lam | G01S 13/904 342/351 |
| 6,879,752 | B1 | 4/2005 | Ilchenko et al. | |
| 7,184,624 | B1* | 2/2007 | Matsko | G02B 6/2934 372/98 |
| 7,271,379 | B2* | 9/2007 | Fan | G01N 21/6428 385/28 |
| 7,545,843 | B2* | 6/2009 | Armani | G02B 6/12007 372/19 |
| 7,781,217 | B2* | 8/2010 | Armani | H01S 3/083 436/57 |
| 7,914,454 | B2* | 3/2011 | Weber | G01S 15/8927 600/407 |
| 8,437,591 | B1* | 5/2013 | Lu | G01N 21/7746 385/27 |
| 8,493,560 | B2* | 7/2013 | Shopova | G01N 21/7746 435/7.1 |
| 9,354,174 | B2* | 5/2016 | Poetter | B82Y 10/00 |
| 9,554,774 | B2* | 1/2017 | Moore | A61B 8/5223 |
| 9,588,061 | B2* | 3/2017 | Sun | G01N 22/00 |
| 9,733,125 | B2* | 8/2017 | Liu | G01J 3/10 |
| 9,846,126 | B2* | 12/2017 | Gunn, III | G01N 21/255 |
| 11,041,811 | B2 | 6/2021 | Gunn, III et al. | |
| 12,025,489 | B1* | 7/2024 | Li | G01H 9/004 |
| 2005/0263679 | A1* | 12/2005 | Fan | G02B 6/4246 250/214.1 |
| 2007/0114364 | A1* | 5/2007 | Fan | G02B 6/4246 385/28 |
| 2007/0269901 | A1* | 11/2007 | Armani | H01S 3/083 436/164 |
| 2007/0284513 | A1* | 12/2007 | Fan | G02B 6/4246 250/216 |
| 2008/0095490 | A1* | 4/2008 | Ashkenazi | G02B 6/138 385/13 |
| 2014/0360273 | A1* | 12/2014 | Zhang | G01N 21/1702 73/643 |
| 2016/0266110 | A1* | 9/2016 | Ozdemir | G01N 15/1434 |
| 2016/0273943 | A1* | 9/2016 | Grubel | G01H 9/00 |
| 2018/0164307 | A1* | 6/2018 | Ozdemir | G01N 33/54373 |
| 2018/0238833 | A1* | 8/2018 | Somekh | G01N 29/036 |
| 2020/0355678 | A1* | 11/2020 | Ozdemir | G01N 21/45 |
| 2021/0181422 | A1* | 6/2021 | Liao | G02B 6/2551 |
| 2022/0350082 | A1* | 11/2022 | Yang | A61B 5/0095 |
| 2022/0365036 | A1* | 11/2022 | Yang | G01N 29/2418 |
| 2023/0097639 | A1* | 3/2023 | Zhu | G01N 29/0654 73/579 |

FOREIGN PATENT DOCUMENTS

| | | | |
|---|---|---|---|
| CN | 102798624 | A | 11/2012 |
| CN | 112666562 | A | 4/2021 |
| CN | 112690827 | A | 4/2021 |
| CN | 113177992 | A | 7/2021 |
| EP | 3 781 982 | A1 | 2/2021 |
| GB | 2557913 | A | 7/2018 |
| JP | 2008500534 | A | 1/2008 |
| WO | WO-2007/106601 | A2 | 9/2007 |
| WO | WO-2007/106601 | A3 | 9/2007 |
| WO | WO-2016130594 | A1 * | 8/2016 ......... G01N 15/1429 |
| WO | WO-2020/221777 | A1 | 11/2020 |
| WO | WO-2021/055823 | A2 | 3/2021 |
| WO | WO-2021/055823 | A3 | 3/2021 |

OTHER PUBLICATIONS

Betz et al., Identification of structural damage using multifunctional Bragg grating sensors: I. Theory and implementation, Smart Materials and Structures, IOP Publishing Ltd, 2006, pp. 1305-1312 (Year: 2006).*

Betz et al., Acousto-ultrasonic sensing using fiber Bragg gratings, Smart Materials and Structures, IOP Publishing Ltd, 2003, pp. 122-128 (Year: 2003).*

Wu et al., Fiber Acoustic Sensor With Stable Operating-Point Based on a Photo-Thermal Cavity, IEEE Sensors Journal, vol. 22, No. 2, Jan. 15, 2022, pp. 1321-1326 (Year: 2022).*

Fan et al, Fiber-Optic Sensor Based on Core-Offset Fused Unequal-Length Fiber Segments to Improve Ultrasound Detection Sensitivity, IEEE Sensors Journal, vol. 20, No. 16, Aug. 15, 2020, pp. 9148-9154 (Year: 2020).*

Leinders, Suzanne, Characterization of a novel Optical Micromachined Ultrasound Transducer, Delft University of Technology, 2017, p. 130 (Year: 2017).*

Monifi, et al., "Ultrasound Sensing Using a Fiber Coupled Silica Microtoroid Resonator Encapsulated in a Polymer", 2013 IEEE Photonics Conference, Bellevue, WA, USA, doi: 10.1109/IPCon. 2013.6656511, 2013, pp. 2015-2016.

Wei, et al., "High-Frequency Ultrasonic Sensor Arrays Based on Optical Micro-ring Resonators", Proc. SPIE 10600, Health Monitoring of Structural and Biological Systems XII, 1060003, Mar. 27, 2018, 8 pages.

Bae et al. (2008). "A new ultrasonic Synthetic Aperture tissue Harmonic imaging system," 2008 IEEE Ultrasonics Symposium, pp. 1258-1261.

Bae et al. (2011). "A new extended range ultrasonic synthetic aperture tissue harmonic imaging system," 2011 IEEE International Ultrasonics Symposium, pp. 401-404.

Bao, Y. et al. (2015). "A digitally generated ultrafine optical frequency comb for spectral measurements with 0.01-pm resolution and 0.7-μs response time," Light: Science & Applications, 4(6):e300.

Berneschi, S. et al. (2011). "High Q silica microbubble resonators fabricated by arc discharge," Optics letters 36:3521-3523.

Carmon, T. et al. (2007). "Wavelength-independent coupler from fiber to an on-chip cavity, demonstrated over an 850nm span," Optics Express 15:7677-7681.

Chistiakova, M. et al. (2014). "Photoelastic ultrasound detection using ultrahigh-Q silica optical resonators," Opt. Express 22:28169-28179.

Fan, X. et al. (2007). "Overview of novel integrated optical ring resonator bio/chemical sensors," Laser Resonators and Beam Control IX, vol. 6452, 64520-1-64520-20.

Friederich, F. et al. (2011). "THz Active Imaging Systems with Real-Time Capabilities," IEEE Transactions on Terahertz Science and Technology, vol. 1, No. 1, pp. 183-200.

Gallagher, K.A. et al. (2017). "Static and Moving Target Imaging Using Harmonic Radar," Electronics 6:30.

He, L. et al. (2011). "Detecting single viruses and nanoparticles using whispering gallery microlasers," *Nature Nanotechnology* 6:428-432.

Henze, R. et al. (2011). "Tuning whispering gallery modes using internal aerostatic pressure," Optics letters 36:4536-4538.

International Search Report mailed on Apr. 29, 2021, for PCT Application No. PCT/US2020/064094, filed on Dec. 9, 2020, 7 pages.

(56) References Cited

OTHER PUBLICATIONS

International Search Report mailed on Jun. 29, 2021, for PCT Application No. PCT/US2021/022412, filed on Mar. 15, 2021, 4 pages.
International Search Report mailed on Mar. 9, 2021, for PCT Application No. PCT/US2020/051596, filed on Sep. 18, 2020, 3 pages.
Ioppolo, T. et al. (2007). "Pressure tuning of whispering gallery mode resonators," J. Opt. Soc. Am. B. 24:2721-2726.
Jiang, X. et al. (2020). "Whispering-gallery sensors," Matter 3:371-392.
Kim, K.H. et al. (2017). "Air-coupled ultrasound detection using capillary-based optical ring resonators," Scientific Reports 7:109.
Kim, Hyung Ham (May 2010). "Array transducers for high frequency ultrasound imaging," Dissertation, 113 total pages.
Lee, W. et al. (2011). "A quasi-droplet optofluidic ring resonator laser using a micro-bubble," Applied Physics Letters 99:091102.
Li, M. et al. (2013). "Self-referencing optofluidic ring resonator sensor for highly sensitive biomolecular detection," Analytical chemistry 85:9328-9332.
Madhvapathy, S. et al. (May 2021). "Ultrasound detection with silicon microring resonators," Electrical Engineering and Computer Sciences, University of California, Berkeley, Technical Report No. UCB/EECS-2021-123, 53 total pages.
Maxwell, A. et al. (2020), "Polymer microring resonators for high-frequency ultrasound detection and imaging"; IEEE J. Sel. Top Quantum Electron 14:191-197.
Minamikawa, T. et al. (2017). "Optical-frequency-comb based ultrasound sensor," Photons Plus Ultrasound: Imaging and Sensing 2017, Proceedings vol. 10064, SPIE BiOS 2017, 7 total pages.
Monifi, F. et al. (2013). "Encapsulation of a fiber taper coupled microtoroid resonator in a polymer matrix"; pp. 1-6, located at https://arxiv.org/pdf/1304.6423.pdf, 6 total pages.
Monifi, F. et al. (2013). "Ultrasound sensing using a fiber coupled silica microtoroid resonator encapsulated in a polymer," IEEE Photonics Conference, Bellevue, WA, USA, pp. 215-216.
Monifi, F. et al. (2012). "A robust and tunable add-drop filter using whispering gallery mode microtoroid resonator," Journal of Lightwave Technology 30:3306-3315.
Nikolov, S.I. et al. (2015). "Synthetic aperture imaging using a semi-analytic model for the transmit beams," 2015 IEEE International Ultrasonics Symposium (IUS), pp. 1-4.
Petermann, A.B. et al. (2017). "Polymer WGM arrays for optical sensing applications," 2017 Conference on Lasers and Electro-Optics Europe & European Quantum Electronics Conference (CLEO/Europe-EQEC), 1 total page.
Rasmussen, J.H. et al. (2012). "Implementation of tissue harmonic synthetic aperture imaging on a commercial ultrasound system," 2012 IEEE International Ultrasonics Symposium, pp. 121-125.
Rasmussen, J.H. et al. (2013). "Preliminary study of synthetic aperture tissue harmonic imaging on in-vivo data," Proceedings vol. 8675, SPIE Medical Imaging 2013: Ultrasonic Imaging, Tomography, and Therapy, 867512.
Seo, H. et al. (2019). "Synthetic aperture imaging of contact acoustic nonlinearity to visualize the closing interfaces using toneburst ultrasonic waves," Mechanical Systems and Signal Processing 125:257-274.
Srinivasan, K. et al. (2004). "Optical-fiber-based measurement of an ultrasmall volume high-Q photonic crystal microcavity," Physical Review B. 70:081306-1-081306-4.
Sumetsky, M. et al. (2010). "Optical microbubble resonator," Optics Letters 35:898-900.
Thijssen J.M. et al. (2014). "Cardiological Ultrasound Imaging." Curr Pharm Des. 20:6150-6161.
Vollmer, F. et al. (2012). "Label-free detection with high-Q microcavities: a review of biosensing mechanisms for integrated devices," Nanophotonics 1(3-4):267-291.
Ward, J.M. et al. (2014). "Hollow core, whispering gallery resonator sensors," The European Physical Journal Special Topics 223:1917-1935.
Ward, J.M. et al. (2013). "Highly Sensitive Temperature Measurements with Liquid-Core Microbubble Resonators," IEEE Photonics Technology Letters 25:2350-2353.
Watkins, A. et al. (2011). "Single-input spherical microbubble resonator," Optics letters 36:2113-2115.
Wells, P.N.T. (1999). "Ultrasonic imaging of the human body," Rep. Prog. Phys. 62:671-722.
Written Opinion of the International Searching Authority mailed on Apr. 29, 2021, for PCT Application No. PCT/US2020/064094, filed on Dec. 9, 2020, 11 pages.
Written Opinion of the International Searching Authority mailed on Jun. 29, 2021, for PCT Application No. PCT/US2021/022412, filed on Mar. 15, 2021, 7 pages.
Written Opinion of the International Searching Authority mailed on Mar. 9, 2021, for PCT Application No. PCT/US2020/051596, filed on Sep. 18, 2020, 10 pages.
Yang, Y. et al. (2014). "Quasi-droplet microbubbles for high resolution sensing applications," Optics express 22:6881-6898.
Japanese Application No. 2022-560166, "Office Action" mailed Sep. 24, 2024.
Chinese Application No. 202180032190.3, "Office Action", Jan. 9, 2025, 18 pages.
European Application No. 21717646.0, "Office Action", Jan. 2, 2025, 6 pages.
Japanese Application No. 2022-560166, "Notice of Allowance", Mar. 19, 2025, 5 pages.

* cited by examiner

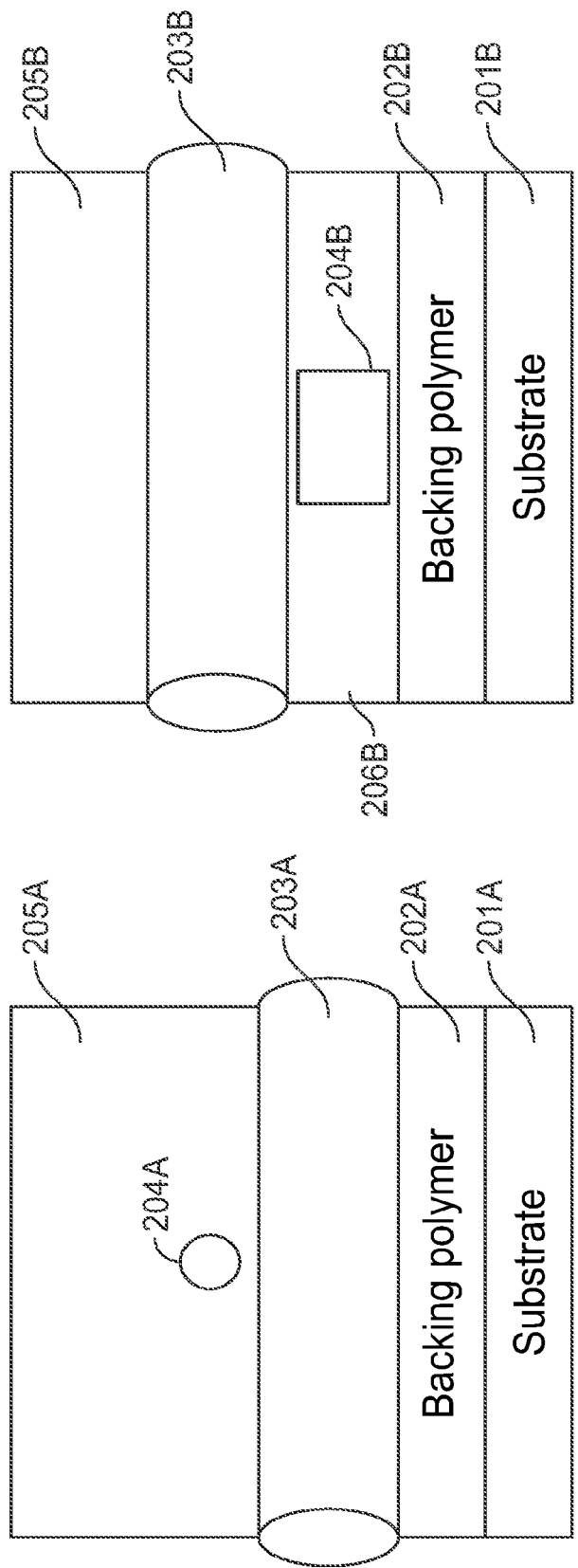

OPTICAL MICRORESONATOR ARRAY DEVICE FOR ULTRASOUND SENSING

CROSS-REFERENCE TO RELATED APPLICATIONS

This application is a Continuation of International Patent Application No. PCT/US2021/022412, filed Mar. 15, 2021, which claims priority to U.S. Patent Application No. 63/001,738 filed Mar. 30, 2020, each of which is incorporated herein in its entirety by this reference.

TECHNICAL FIELD

The present disclosure generally relates to the field of ultrasound, and in particular to methods and devices that enable ultrasound sensing using an array of optical microresonators.

BACKGROUND

Ultrasound sensing is used in various industries including medical imaging, due to a number of advantages. For example, ultrasound sensing utilizes ultrasound signal which has a remarkable penetration depth. Moreover, ultrasound imaging is known to be an advantageously non-invasive form of imaging, as it is based on non-ionizing radiation. Conventional ultrasound sensing uses piezoelectric materials such as lead-zirconate-titanate (PZT), polymer thick film (PTF) and polyvinylidene fluoride (PVDF). However, some of the challenges associated with use of piezoelectric properties of these materials include high operation voltage requirements, a high electric field requirement (which may cause breakdown and failure), a non-linear response with high hysteresis, and limited angle of detection. Thus, there is a need for new and improved devices and methods for ultrasound sensing.

SUMMARY

Generally, in some embodiments, an apparatus may include one or more (e.g., a plurality of) optical fibers, one or more optical waveguides, and a plurality of resonator nodes arranged in an array of sensing locations. Each resonator node may include an optical coupling between an optical waveguide and an optical fiber that has a set of resonant frequencies at a respective sensing location. Each resonator node may be further configured to communicate a set of signals corresponding to a shift in the set of resonant frequencies in the optical fiber at the respective sensing location. In some embodiments, each optical fiber may have the same or substantially similar cross-sectional geometry and/or material uniformity, such that the optical fibers may have the same or substantially similar set of resonant frequencies. By leveraging such uniform material characteristics (e.g., utilizing optical fibers produced in bulk), an ultrasound sensing system including such an apparatus may be more easily mass-produced in a cost-efficient and consistent manner and have more consistent, predictable performance.

In some embodiments, the one or more optical fibers may be configured to receive multiple ultrasound echoes. Furthermore, the one or more optical fibers may be configured to experience the shift in the set of resonant frequencies in response to the multiple ultrasound echoes. In some embodiments, the one or more optical waveguides are configured to propagate a set of signals corresponding to the at least one shift in the set of resonant frequencies to an optical detector.

In some embodiments, the one or more optical waveguides may include one or more tapered optical fibers or one or more integrated photonic waveguides (e.g., a silicon photonic waveguide). The one or more tapered optical fibers may be in a polymer structure.

The one or more optical fibers may be arranged perpendicular to the one or more optical waveguides. For example, in some embodiments, the one or more optical fibers maybe arranged linearly at a predetermined equidistance from each other and perpendicular to the one or more tapered optical fibers. Furthermore, the one or more optical fibers and the one or more optical waveguides may be arranged in a rectangular grid.

In some embodiments, the one or more optical waveguides may be coupled to a light source, and the light source may propagate the light in the one or more optical waveguides. For example, the light source may include a broadband light source or a tunable laser source.

The one or more optical fibers and the one or more optical waveguides may be arranged in any suitable manner that enables optical coupling at each resonator node. For example, in some embodiments, an optical fiber may be in physical contact with an optical waveguide at a resonator node. Alternatively, in embodiments there may be a short separation gap (e.g., about a 1 µm separation or less) between an optical fiber and an optical waveguide at a resonator node. Furthermore, the optical waveguides and the optical fibers may be spaced apart in any suitable manner. For example, in some embodiments, the distance between optical waveguides of the one or more optical waveguides may be at least about 20 times the wavelength of the light from the light source. In some embodiments, the distance in between optical fibers of the one or more optical fibers may be less than about 3 times the wavelength of the light.

Generally, in some embodiments, a method for ultrasound sensing may include receiving at one or more optical waveguides, via multiple (e.g., more than one) resonator nodes, a first set of signals corresponding to a first set of whispering gallery modes that propagate along the circumference of one or more optical fibers. The method may further include receiving at the one or more optical waveguides, via the multiple resonator nodes, a second set of signals corresponding to a second set of whispering gallery modes that propagate along the circumference of each optical fiber. In some embodiments, the second set of whispering gallery modes may propagate in response to the one or more optical fibers receiving multiple ultrasound echoes. The method may further include detecting a set of differences between the first set of signals and the second set of signals. The method may further include calculating a magnitude of each ultrasound echo at each resonator node based at least in part on the first set of signals, the second set of signals, and/or the set of differences. The method may further include associating the magnitude of each ultrasound echo to a sensing location of each resonator node. In some embodiments, the method may further include transmitting multiple ultrasound signals using multiple piezoelectric elements. The method may further include receiving the multiple ultrasound echoes corresponding to the multiple ultrasound signals at the one or more optical fibers, the multiple resonator nodes may be configured to perform a synthetic aperture (SA) operation or a compressed sensing (CS) operation.

In some embodiments, the one or more optical fibers may include a plurality of optical fibers having the same or substantially similar cross-sectional geometry and material
} so as to have the same or substantially similar sets of resonance frequencies In some embodiments, the one or more optical fibers may be perpendicular to the one or more optical waveguides. In some embodiments, the one or more optical waveguides may include one or more tapered optical fibers and/or one or more integrated photonic waveguides, or another suitable waveguide that may be coupled to a light source so as to propagate light from the light source. In some embodiments, the one or more optical fibers and/or the one or more optical waveguides may be in a polymer structure.

The one or more optical fibers and the one or more optical waveguides may be arranged in any suitable manner that enables optical coupling at each resonator node. For example, in some embodiments, an optical fiber may be in physical contact with an optical waveguide at a resonator node. Alternatively, in embodiments there may be a short separation gap (e.g., about a 1 μm separation or less) between an optical fiber and an optical waveguide at a resonator node. Furthermore, the optical waveguides and the optical fibers may be spaced apart in any suitable manner. For example, in some embodiments, the distance between optical waveguides of the one or more optical waveguides may be at least about 20 times the wavelength of the light from the light source. In some embodiments, the distance in between optical fibers of the one or more optical fibers may be less than about 3 times the wavelength of the light.

Generally, in some embodiments, an apparatus may include one or more optical fibers and one or more optical waveguides that are optically coupled to the one or more optical fibers at multiple resonator nodes. The circumference of each optical fiber may be configured to propagate a first set of whispering gallery modes. In some embodiments, the one or more optical fibers communicate to the one or more optical waveguides a first set of signals corresponding to the first set of whispering gallery modes. The one or more optical waveguides may be configured to propagate the first set of signals to at least one optical detector.

In some embodiments, the one or more optical fibers may include a plurality of optical fibers having the same or substantially similar cross-sectional geometry and material so as to have the same or substantially similar sets of resonance frequencies In some embodiments, the one or more optical fibers may be perpendicular to the one or more optical waveguides. In some embodiments, the one or more optical waveguides may include one or more tapered optical fibers and/or one or more integrated photonic waveguides, or another suitable waveguide that may be coupled to a light source so as to propagate light from the light source. In some embodiments, the one or more optical fibers and/or the one or more optical waveguides may be in a polymer structure.

The one or more optical fibers and the one or more optical waveguides may be arranged in any suitable manner that enables optical coupling at each resonator node. For example, in some embodiments, an optical fiber may be in physical contact with an optical waveguide at a resonator node. Alternatively, in embodiments there may be a short separation gap (e.g., about a 1 μm separation or less) between an optical fiber and an optical waveguide at a resonator node. Furthermore, the optical waveguides and the optical fibers may be spaced apart in any suitable manner. For example, in some embodiments, the distance between optical waveguides of the one or more optical waveguides may be at least about 20 times the wavelength of the light from the light source. In some embodiments, the distance in between optical fibers of the one or more optical fibers may be less than about 3 times the wavelength of the light.

In some embodiments, the one or more optical fibers are configured to receive multiple ultrasound echoes and propagate a second set of whispering gallery modes in response to the multiple ultrasound echoes. The one or more optical fibers are configured to communicate to the one or more optical waveguides a second set of signals corresponding to the second set of whispering gallery modes. In some embodiments, the one or more optical waveguides are configured to propagate the second sets of signals to the at least one optical detector.

In some embodiments, the one or more optical fibers may be configured to communicate, through the multiple resonator nodes, to the one or more optical waveguides a set of signals corresponding to a difference between the first set of whispering galley modes and the second set of whispering gallery modes. For example, the difference between the first set of whispering gallery modes and the second set of whispering gallery modes includes at least one of a shift in a resonant frequency of the optical fiber and/or an attenuation of a resonance of the one or more optical fibers.

BRIEF DESCRIPTION OF THE DRAWINGS

FIG. 2A is a schematic description of an exemplary method of packaging an optical microresonator array.

FIG. 2B is a schematic description of an exemplary method of packaging an optical microresonator array.

DETAILED DESCRIPTION

Non-limiting examples of various aspects and variations of the invention are described herein and illustrated in the accompanying drawings.

Exemplary optical microresonator arrays and methods of making the same are described herein. Furthermore, as described herein, such optical microresonator arrays may be combined to form optical microresonator arrays with high quality factor and various other beneficial features as described below, for use in applications such as ultrasound sensing and/or ultrasound imaging.

Optical Microresonator Arrays

Figure 1A:
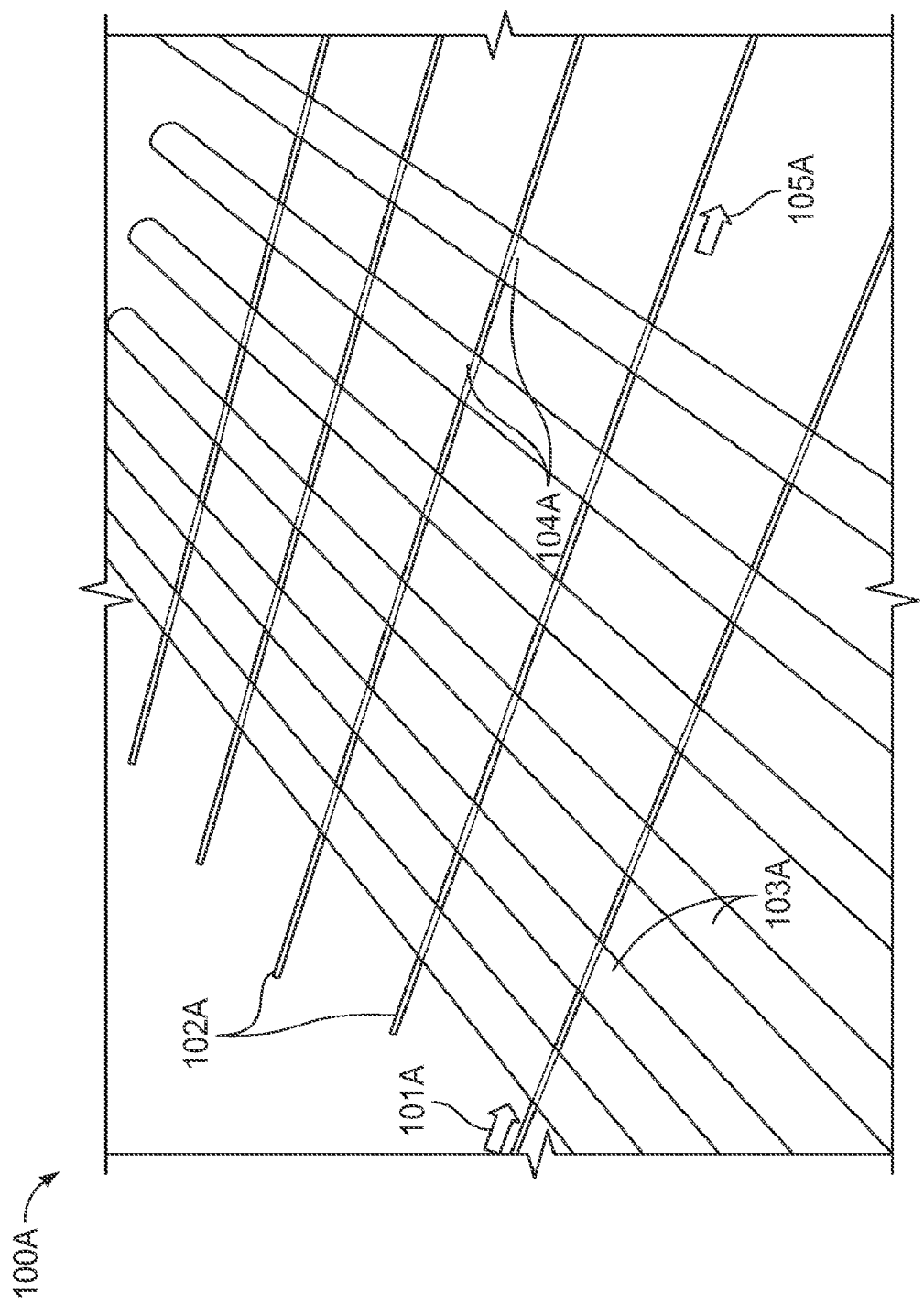
FIG. 1A is a schematic description of an exemplary optical microresonator array.

Described herein are optical microresonator arrays suitable for high sensitivity applications including high sensitivity acousto-optic sensing systems. For example, as shown in FIG. 1A, an exemplary optical microresonator array 100A may include a set of (e.g., a plurality of) optical fibers 103A, a set of (e.g., a plurality of) optical waveguides 102A, and multiple resonator nodes 104A arranged in an array of sensing locations. Each resonator node 104A may comprise an optical coupling between an optical waveguide and an optical fiber at a respective sensing location. Each optical fiber may have a set of resonant frequencies, and each resonator node 104A may be further configured to communicate a set of signals corresponding to at least one shift in the set of resonant frequencies in the optical fiber at the respective sensing location. At each resonator node, the cross-section of the optical fiber may function as an optical microresonator (e.g., whispering gallery mode microresonator) configured to communicate a set of signals corresponding to the at least one shift in the set of resonant frequencies in the optical fiber. These signals are associated with the respective sensing location for that resonator node.

Each optical microresonator of the optical microresonator arrays includes a closed loop of a transparent medium that allows some permitted frequencies of light to continuously propagate inside the closed loop, and to store optical energy of the permitted frequencies of light in the closed loop. As such, the optical microresonator permits a propagation of whispering gallery modes (WGMs) traveling around the optical microresonator and corresponding to the permitted frequencies to circulate the circumference of the optical microresonator. Each mode from the WGMs may, for example, correspond to propagation of a frequency of light from the permitted frequencies of light.

The optical microresonator arrays described herein have high sensitivity due at least in part on having high quality factors, in that they advantageously allow the permitted frequencies of light to stay in the closed loop of the optical microresonator array for a long period of time. The permitted frequencies of light and the quality factor of the optical microresonator array described herein may be based at least in part on geometrical parameters of the optical microresonator array, refractive index of the transparent medium, and refractive indices of an environment surrounding the optical microresonator array.

As further described herein, the optical microresonator arrays may be configured to receive light, to transmit light, and to be useful in practice (e.g., for an ultrasound imaging or other sensing application in an acousto-optic system). Acousto-optic systems based on the optical microresonator arrays may directly measure ultrasonic waves through the photo-elastic effect and/or physical deformation of the optical microresonator arrays in response to the ultrasonic waves (e.g., ultrasonic echoes). For example, in the presence of ultrasonic (or any pressure) waves, the WGMs traveling an optical microresonator arrays may undergo a set of one or more spectral shifts caused by changes in the refractive index and/or shape of the optical microresonator arrays. The spectral change can be easily monitored and analyzed in spectral domain and light transmission intensity to and from the optical microresonator array. Additional spatial and other information can furthermore be derived by monitoring and analyzing shifting WGMs among multiple optical microresonator arrays.

In some embodiments, the optical microresonator arrays may include optical fibers having identical or substantially similar cross-sectional characteristics (e.g., cross-sectional geometry and/or material properties) along their length and/or with respect each other, as further described herein. Accordingly, the availability of bulk-produced optical fibers may be leveraged to manufacture optical microresonator arrays in an efficient, highly reproducible manner suitable for mass production. Furthermore, using such similar, bulk-produced optical fibers (and/or optical waveguides) in the optical microresonator arrays may result in more consistent, reliable performance in ultrasound sensing. Thus, the optical microresonator arrays described herein provide several advantages over microresonator arrays formed from conventional techniques, in which standalone microresonators must be painstakingly individually formed before being combined into an array, and yet may exhibit inconsistent or unreliable performance as the result of variability among the individual microresonators and/or require complex micro- or nanofabrication techniques to trim individual microresonator resonance wavelengths. Furthermore, for embodiments of the optical microresonator array having optical fibers with identical or very close WGM resonance conditions and resonant frequencies, it may be possible to use a single frequency laser or other single frequency light source to probe or excite all the WGMs in the optical microresonator array simultaneously, thereby simplifying operation of the sensing microresonator array.

Alternatively, in some embodiments at least some of the optical fibers may have varying known cross-sectional characteristics (e.g., different radii, different material profiles) thus exhibit different resonance frequencies which are accounted for during analysis of the signals obtained as the result of shifting WGMs.

Optical Fibers and Optical Waveguides

The set of optical fibers 103A in the optical microresonator array may be made of a material (e.g., glass, polymer, crystal, etc.) transparent to a frequency of light propagating inside the set of optical fibers. The set of optical fibers 103A may include, for example, a set of one or more single model optical fibers, a set of one or more multimode optical fibers, a set of one or more graded index optical fibers, a set of one or more step index optical fibers, a set of one or more polarization maintaining optical fibers, and/or any optical fiber that is suitable for supporting a whispering gallery mode at its circumference. In some embodiments, the set of optical fibers may include commercially available fibers that collectively have the same or significantly similar properties in term of size, refractive index, and/or resonance wavelength, for example. For example, a set of single mode optical fibers can have a very uniform material index of 1.5 and a diameter of 125 µm at any perpendicular cross-section of the set of single mode optical fibers.

In some embodiments the set of optical fibers 103A may be selected to and/or etched to have a small radius. The smaller radius of the set of optical fibers results in larger free spectral range of the set of resonant frequencies. As a result, the spectral density of the resonance modes supported by the radius of the set of optical fibers 103A is reduced, which may improve the dynamic range of the sensing performance of the optical microresonator array 100A.

In some embodiments, the set of optical waveguides 102A may include a set of integrated photonic waveguides made of glass, silicon, silicon nitride, and/or any material transparent to a frequency of light propagating inside the set of optical fibers. For example, the set of optical waveguides 102A may include a set of strip waveguides, slot waveguides, slab waveguides, strip-loaded slot waveguides, photonic crystal waveguides, and/or any integrated photonic waveguides that is suitable for supporting propagation of light across the length of the optical microresonator array.

Additionally or alternatively, the set of optical waveguides 102A may include a set of tapered optical fibers produced from optical fibers. For example, at least a portion of the set of optical waveguides 102A can be produced from a set of single model optical fibers, multimode optical fibers, graded index optical fibers, step index optical fibers, polarization maintaining optical fiber, and the like. Generally, in some embodiments, the set of tapered optical fibers may be produced by gently stretching the optical fibers while it is heated. In doing so, the optical fibers become thinner over some length. Additionally or alternatively, in some embodiments, at least a portion of the set of tapered fibers may be produced by etching (e.g., using wet etch) a cladding of optical fibers in whole or in part.

In some embodiments, the set of optical fibers and/or the set of tapered optical fibers can be etched to reduce their size. For example, the set of optical fibers and/or the set of tapered optical fibers can be etched using a chemical solution (e.g., hydrochloric acid) to reduce their length and/or radius. A predetermined portion of the set of optical fibers and or the set of tapered optical fibers may be exposed to chemical solution, so that only the part exposed to the chemical solution is etched.

The system may further include one or more light sources. For example, the set of optical waveguides 102A may be coupled to a set of one or more light sources such that input light 101A from the set of light sources into the set of optical waveguides 102A and into the optically-coupled optical fibers 103A. Light then propagates along the azimuthal angle of each optical fiber to excite the WGM of the resonator nodes as further described herein. Additionally, light can additionally couple out from the optical fibers 103A and back into the optical waveguides 102A.

The one or more light sources can include a broadband light source, a tunable laser source, an optical frequency comb (OFC) laser source using either a digital modulating method or using a Kerr four-wave mixing (FWM) method, and/or any other light sources suitable for the operation frequency band of the optical microresonator array 100A. In some embodiments, the set of one or more light sources can include a single frequency light source configured to propagate light 101A with identical spectral characteristics into the set of optical waveguides 102A. In some embodiments, at least one light source may include a fiber laser source that launch input light 101A directly into the set of optical fibers which may couple the input light 101A into a set of integrated photonic waveguides. In some embodiments, the set of light sources may include a set of chip-based laser sources that launch the set of input lights 101A directly to the set of integrated photonic waveguides. The set of integrated photonic waveguides may then be configured to couple the set of input lights into a set of tapered fibers. Furthermore, in some embodiments, the one or more light sources may be coupled into a slab or planar waveguide as described in further detail below.

The optical fibers and optical waveguides may be arranged in any of various suitable manners. For example, as shown in FIG. 1A, an optical microresonator array 100A may include tapered optical fibers (functioning as optical waveguides 102A) overlaid over optical fibers 103A to form a plurality of resonator nodes 104A. As described in further detail below, alternatively at least a portion of optical fibers 103A may be overlaid over the tapered optical fibers (waveguides 102A).

Figure 1B:
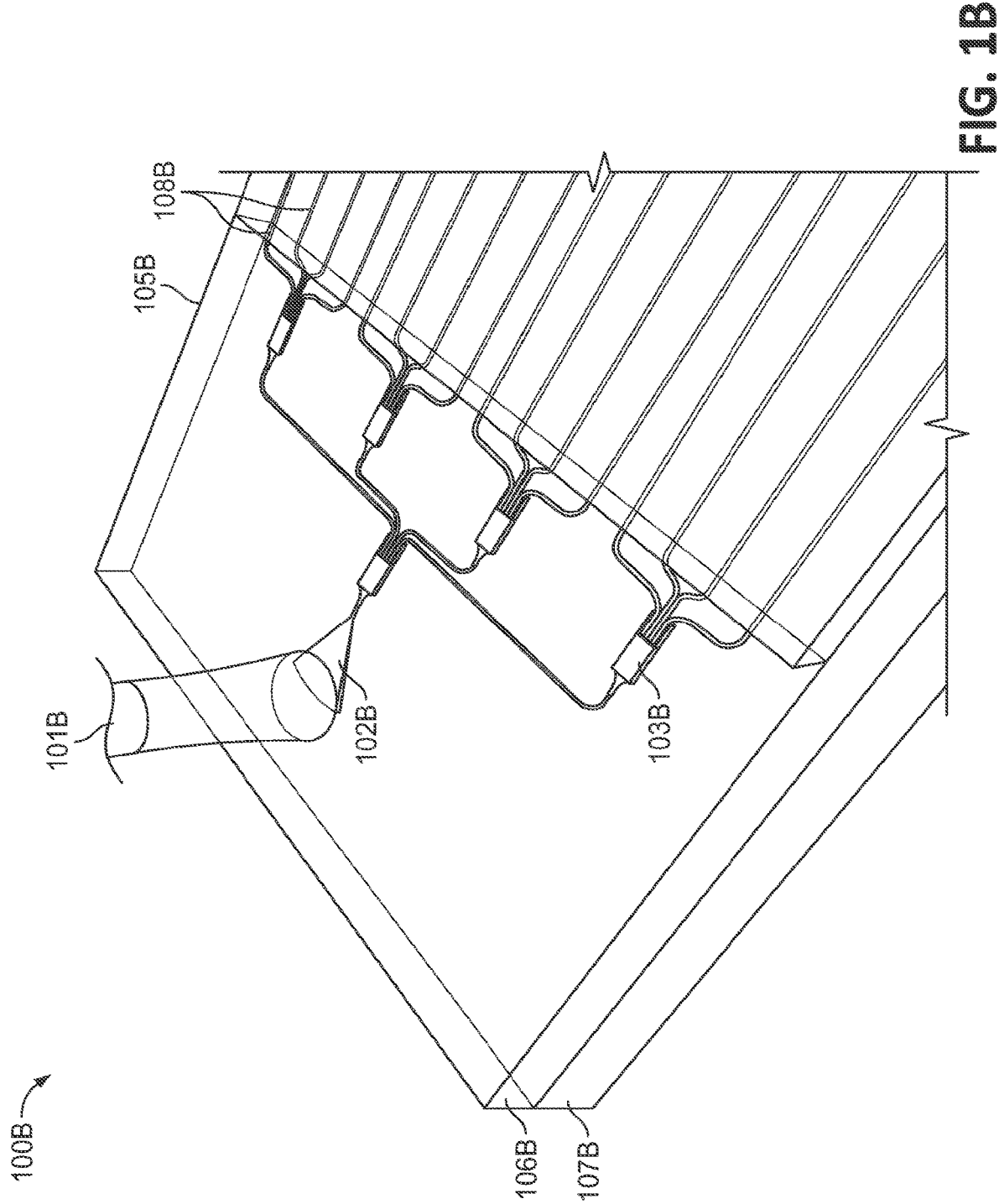
FIG. 1B is a schematic description of an exemplary optical microresonator array.
Figure 1C:
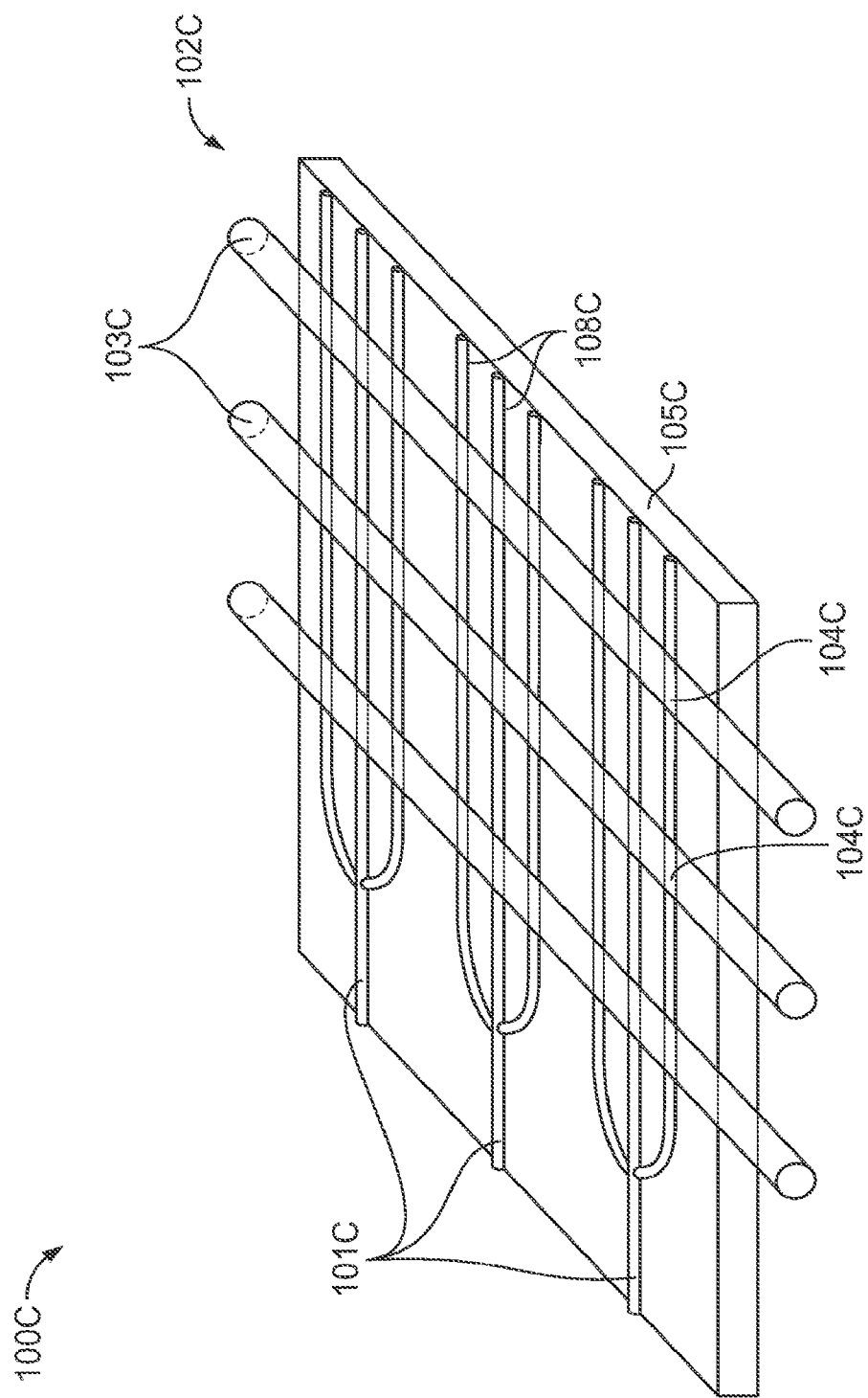
FIG. 1C is a schematic description of an exemplary optical microresonator array.
Figure 1D:
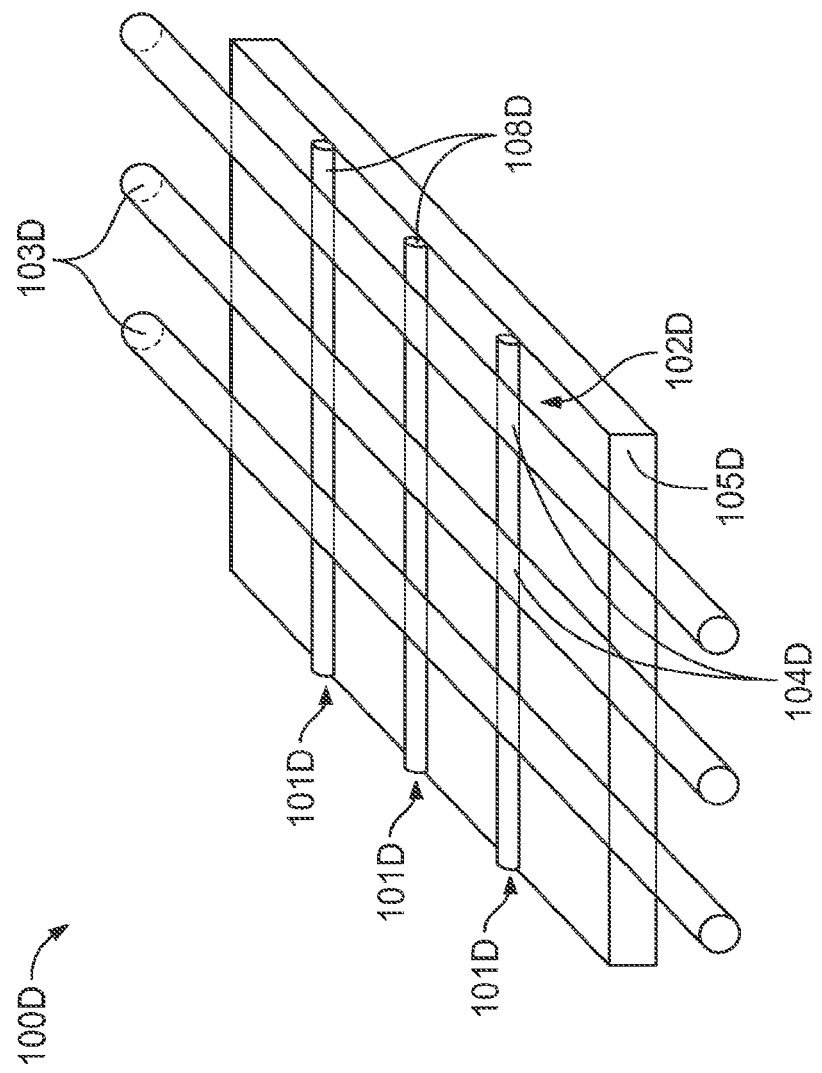
FIG. 1D is a schematic description of an exemplary optical microresonator array.

As another example, one or more optical fibers may be arranged over an integrated photonic waveguide platform, such as a silicon photonic platform, a silicon nitride platform, and/or the like, such as that shown in FIGS. 1B-1D. FIG. 1B is a schematic description of an exemplary integrated photonic optical waveguide array 100B. In some embodiments, the integrated photonic platform may include a substrate 107B (e.g., silicon, silica, silicon nitride, and/or the like), a buried oxide layer 106B, and other integrated photonic components. The optical waveguide array 100B can be coupled to a set of one or more light sources. In some embodiments, the set of light sources can be a fiber-coupled light source or other light source emitting light 101B into a fiber that is aligned vertically to an on-chip grating coupler 102B. The grating coupler 102B combined with other integrated photonic components (e.g., a multimode interference device 103B) may couple the light into the optical waveguide array 100B with one or more optical waveguides 108B. For example, as shown in FIG. 1B, input light from a single light source may be coupled into multiple optical waveguides 108B via a dividing or branching pattern. In some embodiments, at least a portion of the optical waveguide array 100B may be coated with the encapsulation layer 105B (e.g., spin coated with a matching polymer) while other parts of the optical waveguide array 100B may remain uncoated with the encapsulation layer 105B (e.g., by selectively etching the encapsulation layer).

FIG. 1C is a schematic description of another exemplary optical microresonator array 100C in which multiple resonator nodes 104C are positioned at a set of sensing locations. The optical microresonator array 100C may include an optical waveguide array 102C with multiple optical waveguides 108C arranged in an integrated planar optical platform (similar to the optical waveguide array 100B as described above with respect to FIG. 1B) and a set of optical fibers 103C that are optically coupled to the optical waveguide array 102C at the set of sensing locations to establish the multiple resonator nodes 104C. Each resonator node may have a predetermined position with respect to other resonator nodes for determining location of an acoustic echo detected by the resonator node. Similar to that described above with respect to FIG. 1B, the optical waveguide array 102C can include integrated photonic waveguides fabricated on a substrate 105C. In some embodiments, the optical waveguide array may include multiple light sources that couple input light at input waveguides 101C, each of which may be connected in turn to multiple optical waveguides 108C (e.g. via a beam splitter or a fiber coupler). The embodiment shown in FIG. 1C includes a single light input for three optical waveguides; however, it should be understood that other embodiments may include any suitable ratio of light inputs to optical waveguides 108C (e.g., about 1:2, 1:3, 1:4, etc.). Each of the optical waveguides 108C in the optical waveguide array 102C may be perpendicular to a set of optical fibers 103C to produce multiple resonator nodes 104C. As further described herein, the multiple resonator nodes 104C may couple the light into the set of optical fibers 103C to propagate a set of WGMs and generate a set of optical signals into the optical waveguide array 102C. The optical waveguide array may be connected to a set of photodetectors and a multichannel optical spectrum analyzer to characterize the set of optical signals for ultrasound sensing.

FIG. 1D is a schematic description of another optical microresonator array 100D in which a set of resonator nodes 104D are positioned at a set of sensing locations. The optical microresonator array 100D may include an optical waveguide array 102D with multiple optical waveguides 108D arranged in an integrated planar optical platform (similar to the optical waveguide array 100B as described above with respect to FIG. 1B) and a set of optical fibers 103D that are optically coupled to the optical waveguide array 102D at the set of sensing locations to establish the multiple resonator nodes 104D. Each resonator node may have a predetermined position with respect to other resonator nodes for determining location of an acoustic echo detected by the resonator node. As shown in FIG. 1D each optical waveguide 108D from the optical waveguide array 102D can be optically coupled to a respective light input 101D (each of which may, for example, be coupled to a respective light source, or at least some of the light inputs may source light from a common light source). In other words, the ratio of light inputs to optical waveguides 108D may be 1:1). Each of the optical waveguides 108D in the optical waveguide array 102D may be perpendicular to a set of optical fibers 103D to produce multiple resonator nodes 104D. As further described herein, the multiple resonator nodes 104D may couple the light into the set of optical fibers 103D to propagate a set of WGMs and generate a set of optical signals into the optical waveguide array 102D. The optical waveguide array may be connected to a set of photodetectors and a multichannel optical spectrum analyzer to characterize the set of optical signals for ultrasound sensing.

Resonator Nodes

The system may include a set of resonator nodes at various sensing locations where optical waveguides and optical fibers are optically coupled. For example, FIG. 1A is a schematic illustration of an optical microresonator array 100A in which resonator nodes 104A are positioned at sensing locations where the optical fibers 103A and the optical waveguides 102A are optically coupled. Each resonator node may have a predetermined position with respect to other optical microresonators for determining location of a detected acoustic echo.

In some embodiments, the input light 101A may couple to the set of optical fibers 103A, such that a set of whispering gallery modes (WGMs) propagate around the inner circumference of the optical fibers 103A at the multiple resonator nodes 104A. Each resonator node may have an associated sensing coordinate. The multiple resonator nodes 104A may receive a set of ultrasound echoes that are spatially distributed with various intensities across the multiple resonator nodes 104A of the optical microresonator array. In some embodiments, each resonator node may have a predetermined position with respect to other resonator nodes for determining location of an acoustic echo detected by the resonator node. In some other instances, each resonator node may have characteristics geometry and/or material refractive index associated to the resonator node that can distinguish an optical response of the resonator node from other resonator nodes. Sensing using the resonator nodes is described in further detail below.

The resonator nodes 104A may be arranged in various suitable kinds of arrays and in various suitable manners with respect to the set of optical fibers and the set of optical waveguides. In some embodiments, the set of optical fibers 103A may be perpendicular to the optical waveguides 102A so as to allow light from the optical waveguides 102A to circulate around the cross-sections of the optical fibers 130A. For example, the optical fibers may be arranged perpendicular to the optical waveguides using an alignment procedure. The alignment procedure may include propagating a first set of lights having a first set of intensities to the set of optical waveguides 102A. The alignment procedure may further include detecting a second set of light having a second set of intensities. The alignment procedure may include adjusting a set of angles between the set of optical fibers 103A and the set of optical waveguides 102A (e.g., by using a high precision positioning system) to maximize the second set of intensities. In one example, the adjustment of the set of angles is to achieve a perpendicular angle between each optical fiber and optical waveguide. In some instances, the alignment procedure may result in a gap between an optical fiber and an optical waveguide to achieve a coupling condition that results in highest power coupled into the resonator node. In some other instances, an optical fiber may be in physical contact with an optical waveguide so as to improve the stability of the coupling condition. The perpendicular angle between the set of optical fibers 103A and the set of optical waveguides 102A can allow for a light to couple from the set of optical fibers 103A to couple to the set of optical waveguides 102A, and vice versa. In some embodiments, the alignment procedure may include verifying perpendicularity between the set of optical fibers 103A and the set of optical waveguides 102A by verifying the light coupling between the optical fibers and optical waveguides.

In some embodiments, the resonator nodes may be arranged in a grid such as a rectangular array, formed from the optical fibers and the optical waveguides arranged in a grid. For example, the set of waveguides may also be arranged parallel and equidistant from each other, and the optical fibers may be arranged parallel and equidistant from each other and perpendicular to the set of waveguides. However, in some embodiments the optical fibers may be irregularly spaced apart and/or the waveguides may be irregularly spaced apart.

Although in some embodiments the optical microresonator array may include multiple optical waveguides and multiple optical fibers such as that shown in FIG. 1A, it should be understood that multiple resonator nodes may also be formed from only a single optical waveguide, or only a single optical fiber.

Figure 3A:
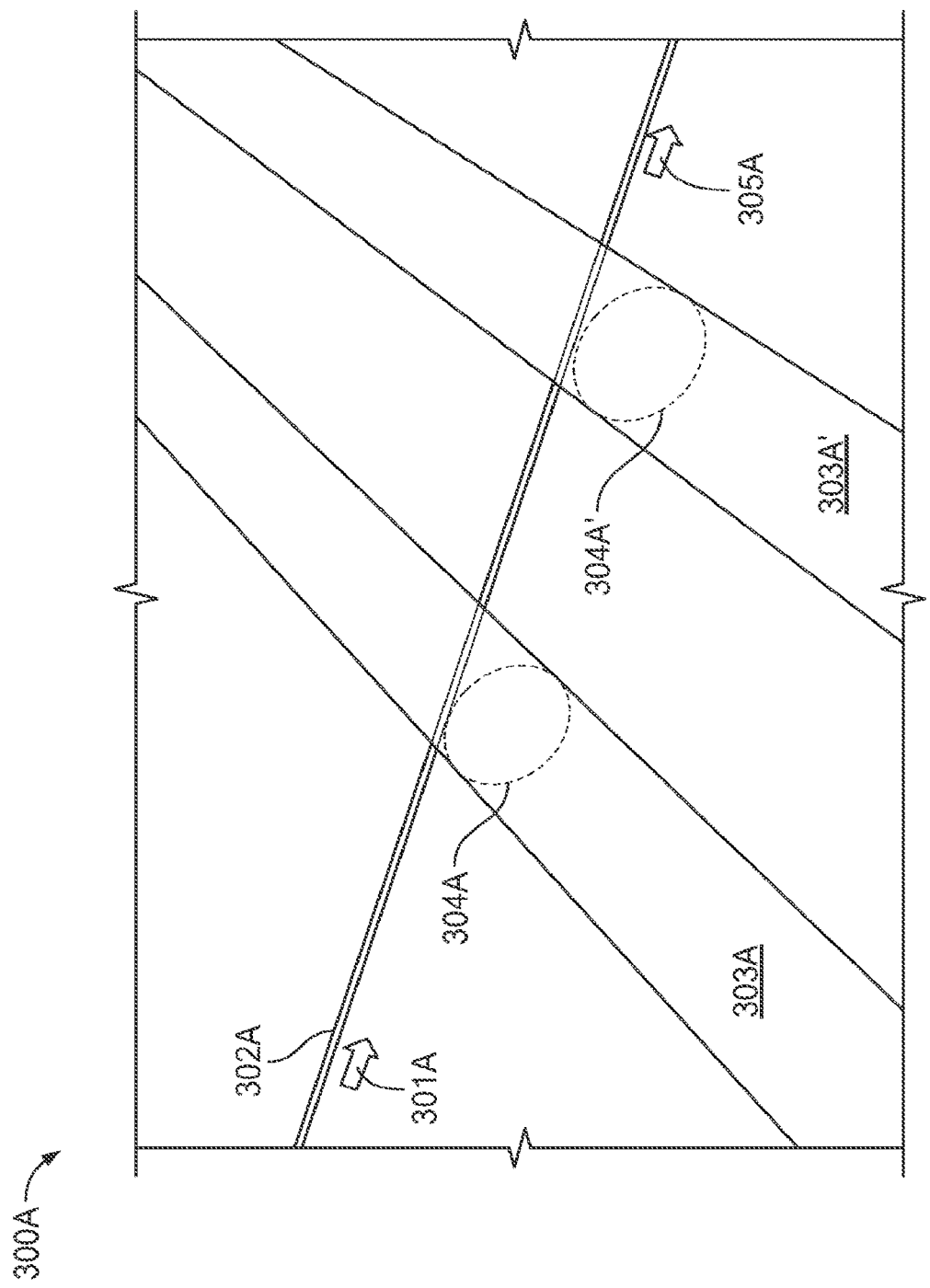
FIG. 3A is a schematic description of an exemplary optical microresonator array.

For example, as shown in FIG. 3A, in some embodiments the optical microresonator array may include multiple resonator nodes formed by a single optical waveguide 302A optically coupled to multiple optical fibers 303A and 303A' at multiple sensing locations. In some instances, a set of light with multiple various wavelengths may propagate in the single optical waveguide 302A. In some other instances, a single wavelength of light may propagate in the single optical waveguide 302A. In some other instances, broadband light 301A may propagate in the single optical waveguide 302A. The single optical waveguide 302A may be perpendicular to and optically coupled to the optical fibers 303A and 303A' at multiple separate sensing locations on the length of the optical waveguide, thereby forming first and second resonator nodes 304A and 304A'. It should be understood that although two resonator nodes are illustrated in FIG. 3A, any suitable number of resonator nodes may be formed along a single optical waveguide by coupling any suitable number of optical fibers (e.g., three, four, five, or more, etc.) to the optical waveguide. Light input 301A may be coupled into and propagated around optical fibers 303A and 303A' respectively to excite the WGMs at the resonator nodes 304A and 304A', respectively. Optical signals embodying WGMs and any shifts in WGMs may then be coupled out at the resonator nodes to the optical fibers and provided as output light 305A.

Figure 3B:
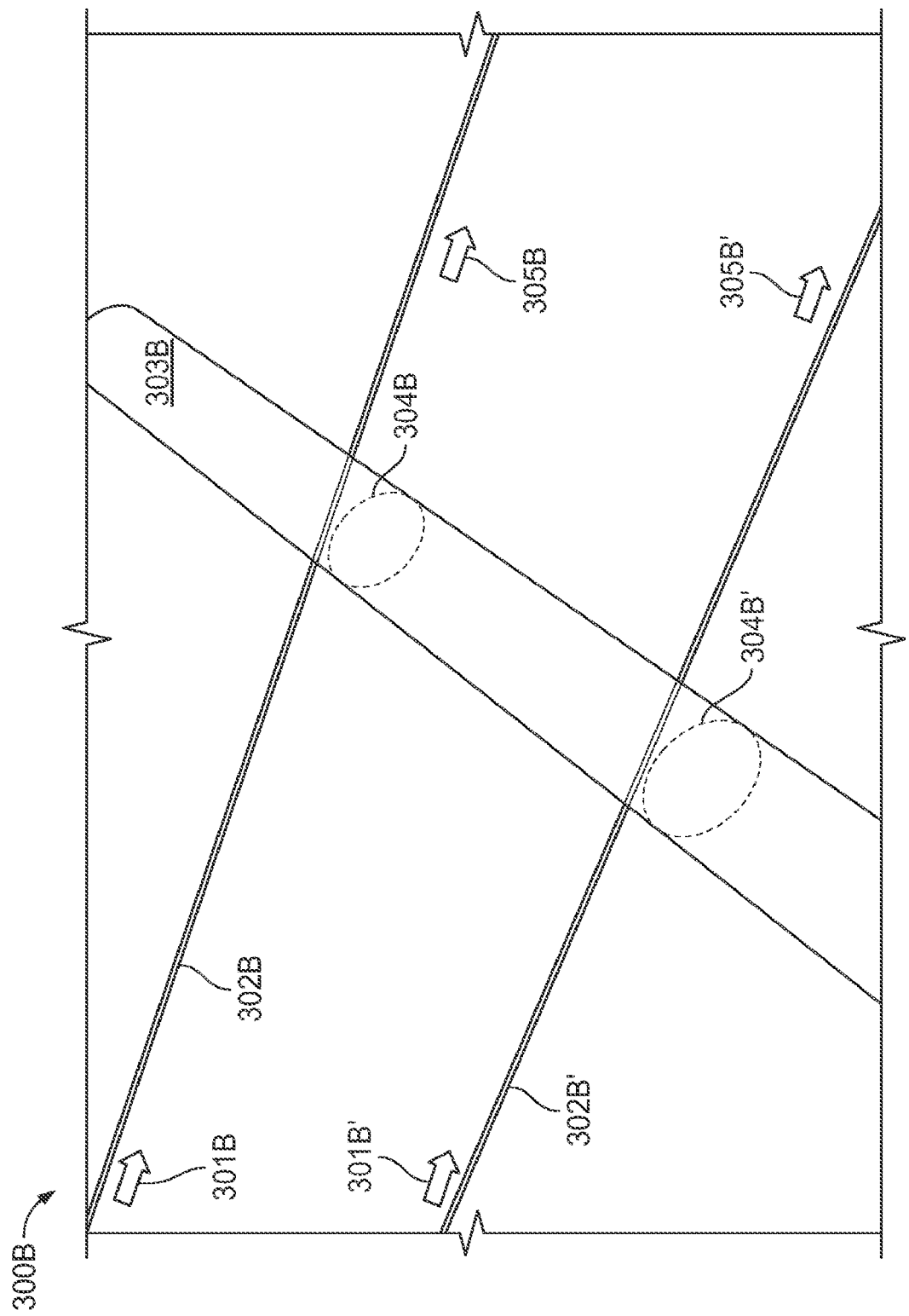
FIG. 3B is a schematic description of an exemplary optical microresonator array.

As another example, as shown in FIG. 3B, in some embodiment, the optical microresonator array may include multiple resonator nodes formed by multiple optical waveguides 302B and 302B' coupled to a single optical fiber 303B at multiple sensing locations. In some instances, a first input light 301B and/or a second input light 301B' each having various wavelengths may propagate in each of the optical waveguides. In some other instances, a first single wavelength light 301B may propagate in one optical waveguide (e.g., optical waveguide 302B) and a second single wavelength light 301B' may propagate in another optical waveguide (e.g., optical waveguide 302B'). The optical waveguide 302B and an optical waveguide 302B' may be perpendicular to and optically coupled to a single optical fiber 303B at multiple separate sensing locations on the length of the optical fiber, thereby forming first and second resonator nodes 304B and 304B'. In some embodiments, the optical waveguide 302B and an optical waveguide 302B' may be identical in radii and material uniformity profiles, and therefore demonstrate identical WGMs and resonant frequencies at a set of resonator nodes 304B and 304B. It should be understood that although two resonator nodes are illustrated in FIG. 3B, any suitable number of resonator nodes may be formed along a single optical fiber by coupling any suitable number of optical waveguides (e.g., three, four, five, or more, etc.) to the optical fiber.

Light input 301B and 301B' may be coupled into and propagated along optical fiber 303B to excite the WGMs at the resonator nodes 304B and 304B', respectively. Optical signals embodying WGMs and any shifts in WGMs may then be coupled out at the resonator nodes to the optical fibers and provided as output light 305B and 305B'.

Sensing at Resonator Nodes

Figure 3C:
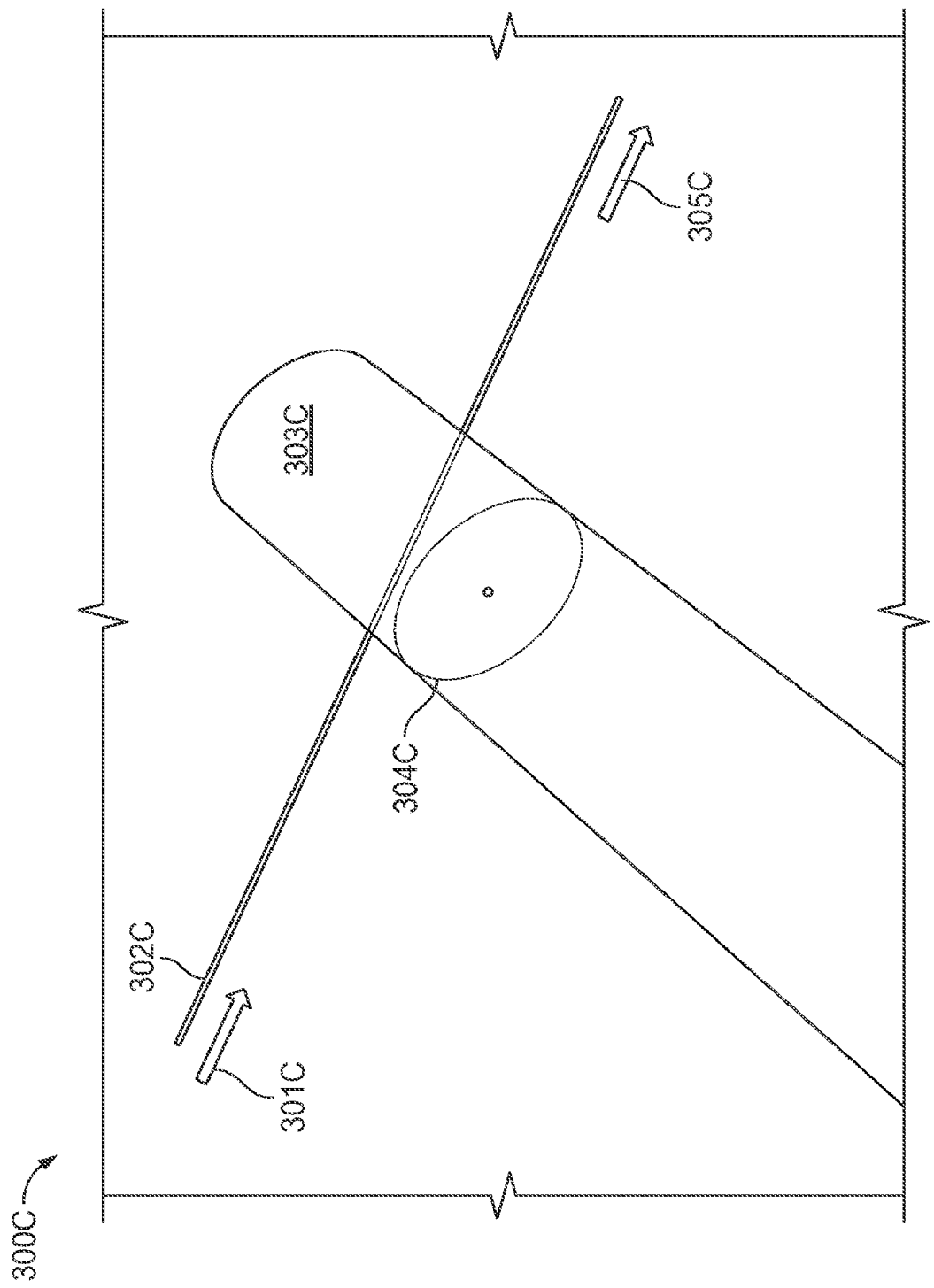
FIG. 3C is a schematic description of an exemplary optical microresonator array.

For simplicity, sensing at the resonator nodes in the optical microresonator array is described below with respect to a single resonator node 304C as shown in FIG. 3C. The resonator node 304C at a sensing location is formed when an optical waveguide 301C is aligned and positioned so as to be optically coupled to a single optical fiber 303C. Across an optical microresonator array, multiple resonator nodes may be located at multiple sensing locations or coordinates. For example, in some embodiments the sensing location may be located at the intersection of the optical waveguide and the optical fiber.

The optical waveguide 302C may be located on top of the optical fiber 303C or at the bottom of the optical fiber 303C (or at any suitable tangent or laterally offset from a tangent by a separation gap). The optical waveguide 302C may be optically coupled to the optical fiber 303C at any location along the length of the single optical fiber 303C. The longitudinal axis of the optical waveguide 302C may be perpendicular to the longitudinal axis of the optical fiber 303C. The optical fiber 303C may be characterized with predetermined geometrical features and material features such as, for example, fiber radius, fiber surface roughness, and/or fiber material refractive index, each of which can affect an impedance, a scattering loss, and/or an absorption loss of the single optical fiber 303C that impacts the set of signals provided by the resonator node.

Additionally, generally, the resonator node 304C has a characteristic set of resonant frequencies determined by geometrical properties and material properties of the features located at the sensing location. These geometrical and material properties at the sensing location may be impacted by a set of ultrasound echoes received at the sensing location, thereby shifting the resonant frequencies and/or attenuating a resonant peak or dip of the set of resonant frequencies of the resonator node 304C. Considering multiple resonator nodes across the entire optical microresonator array, received ultrasound echoes may impact the geometrical properties and/or material properties of multiple resonator nodes with different intensities at different sensing coordinates. Therefore, the ultrasound echoes may shift the set of resonant frequencies and/or attenuate a resonant peak/dip of the set of resonant frequencies of the multiple resonator nodes by various amounts that are indicative of different intensities of the set of ultrasound echoes.

During use in sensing, the optical waveguide 302C may receive and propagate light 301C from a light source. The light may, for example, be a single wavelength light (e.g., a 532 nanometer laser), a broadband light (e.g. an Erbium-doped fiber amplifier), and/or a multi-wavelength light (e.g. a frequency comb). The light may be coupled to the optical fiber 304C at the resonator node 304C to excite a set of WGMs propagating azimuthally around the circumference of the optical fiber. The set of WGMs may result in a set of signals 305C in the optical waveguide 302C. The set of signals may include a set of resonance features that are characteristic of the single resonator node 304C, the single optical waveguide 302C, and/or the single optical fiber 303C.

The single resonator node 304C may then receive a set of ultrasound echoes that mechanically vibrate the optical waveguide 302C, the optical fiber 303C, the resonator node 304C, and/or the material inside and/or outside these components. Accordingly, the geometrical features and/or material refractive index of the optical waveguide 302C, the optical fiber 303C, the resonator node 304C, and/or the material inside and/or outside these components may experience a change associated with a change in the WGMs for the resonator node. The change could be small or large compared to default value of each geometrical feature and/or material refractive index. Even a small change in each geometrical feature and/or material refractive index can significantly impact the resonance features and result in a detectable signal. In one illustrative example, a change in refractive index by $\Delta n=0.01$ of the single optical fiber 303C may be two orders of magnitude smaller than the refractive index $n=1.5$ of the single optical fiber 303C. This change in refractive index, however, may be sufficient to shift the resonance features by a frequency amount comparable to the full-width at half maxima of the resonance feature.

In other words, a set of one or more shifts in resonance features in response to receipt of ultrasound echoes may correspond to a shift in propagation of a set of optical signals (e.g., relating to the difference between a first set of WGMs and a second set of WGMs in response to the ultrasound echoes). The set of shifts in the resonance features can be multiple shifts (i.e., a continuum of shifts, or a shift at each optical frequency). The optical signals may be transmitted to a photo detector or an optical spectrum analyzer to be characterized. For example, a suitable computing device may be operatively coupled to the photodetector and/or an optical spectrum analyzer to detect a difference in optical signals before and after receipt of the ultrasound echoes. In some embodiments, read out the sensing signal from different optical fibers coupled by the same optical waveguide, a timing mechanism may be implemented by syncing the physical perturbation at different optical fibers with optical readout times at the output ends of the optical waveguides.

Furthermore, in some embodiments, light with different wavelengths may be transmitted along the same optical waveguide and be used to probe the WGM in different optical fibers if the different optical fibers have different cross-sectional characteristics (e.g., radii, material) and thus different resonance frequencies. The optical signals read at the output end of the optical waveguides may be separated according to the transmitted wavelengths associated with respective different optical fibers.

In one example, an optical microresonator array can include a set of resonator nodes having a resonant frequency of 193 THz and/or a resonance dip of 10% transmission corresponding to the resonant frequency. The optical microresonator array can receive an ultrasound echo with an intensity of 0.03 W/cm$^2$ at a first sensing coordinate of (x=1, y=1) and an ultrasound echo with an intensity of 0.1 W/cm$^2$ at a second sensing coordinate of (x=3, y=4), where x may indicate the position of an optical fiber and y may indicate the position of an optical waveguide, for example. A first resonator node located at the first sensing coordinate of (x=1, y=1) can shift the resonant frequency of 193 THz to 194 THz due to the ultrasound echo with the intensity of 0.03 W/cm$^2$. On the other hand, a second resonator node located at the second sensing coordinate of (x=3, y=4) can shift the resonant frequency of 193 THz to 198 THz due to the ultrasound echo with the intensity of 0.1 W/cm$^2$. As demonstrated in this example, a magnitude of shift in resonant frequency of each resonator node can be relative to a magnitude of shift in intensity of an ultrasound echo. By mapping the magnitude of resonance shifts for sensing coordinates, ultrasound imaging may be performed based on ultrasound echoes.

The resonator nodes described herein have high sensitivity due at least in part on having high quality factor, in that the resonator nodes advantageously allow the permitted frequencies of light to stay in the closed loop of the optical microresonator for a long period of time. The permitted frequencies of light and the quality factor of the optical microresonators described herein may be based at least in part on geometrical parameters and material parameters (e.g., extinction coefficient, refractive index, defect, homogeneity) of the set of optical fibers, geometrical parameters of the set of waveguides, refractive index of the set of fibers and the set of waveguides, refractive indices of an environment surrounding the set of fibers and the set of waveguides, and/or the like.

Packaging Optical Microresonator Arrays

The performance of the optical microresonator array is at least in part dependent on the elastic and elasto-optic properties of the materials in the device. An optical microresonator array may be packaged (e.g., in a polymer structure) to further enhance capabilities of the optical microresonator array, as shown in FIGS. 2A and 2B. FIG. 2A is a schematic description of an exemplary method of packaging the set of optical fibers 203A and/or the set of optical waveguides 204A in a structure (e.g., in a polymer structure) to produce a packaged optical microresonator array. The structure may include a backing region 202A (e.g., a backing polymer) and/or a matching region 205A (e.g., a matching polymer). In some embodiments, the backing region 202A and/or the matching region 205A can be layers deposited (e.g., spin coated) on a substrate, as described in further detail below. Additionally, the mechanical stability of the optical microresonator array can be also improved at least in part by packaging the optical microresonator array in a material structure such as, for example, a soft material with a low refractive index (at least lower than refractive index of the set of optical waveguides 204A and the set of optical fibers 203A).

The method of packaging the optical microresonator array can include cleaning the surface of a substrate 201A such as, for example, silicon, silica, quartz, plastic, or any other material suitable to serve as a substrate of an acousto-optic sensor device. In some instances, the substrate may be chosen for higher etching rate compared to other materials used in the optical microresonator array, so that it can be etched away after packaging the optical microresonator array. A suitable material to serve as substrate can include a damping material to eliminate a residual vibration and minimize ultrasound echoes within the sensor structures. With reference to FIG. 2A, the substrate 201A can then be coated with one or more coating materials including the backing polymer 202A. The backing polymer 202A can be a damping material such as, for example, a polymer material with a low refractive index configured to obtain a broad whispering gallery mode (WGM) frequency response in the circumference of the set of optical fibers 203A while having high ultrasound attenuation to prevent reverberation of a set of ultrasound echoes that the optical microresonator array is designed to sense. In some embodiments, acoustic impedance of the damping material of the backing polymer can, for example, match with that of the layer of matching polymer 205A utilized for packaging the optical microresonator array as further described below.

As shown in FIG. 2A, the set of optical waveguides 204A such as, for example, a tapered optical fiber, can be placed in the backing polymer 202A or the matching polymer 205A. As described above, the set of optical waveguides 204A can include a set of tapered optical fibers receiving a set of light from a fiber-coupled light source, a set of integrated photonic waveguides receiving a set of light from an on-chip light source, a set of integrated photonic waveguides that are coupled to the set of tapered optical fibers that propagates the set of lights from the fiber-coupled light source, or any other suitable medium to propagate a set of lights from a light source to a set of resonator nodes optically coupling the set of optical fibers 203A and the set of optical waveguides 204A. In some embodiments, the set of optical fibers 203A can be placed in the backing polymer 202A before curing the backing polymer 202A. Placing the set of optical fibers 203A on an uncured backing polymer can result in the set of optical fibers to become embedded in the backing polymer 202A. After placement of the set of optical waveguides 204A, the backing polymer may be cured, such as by baking the backing polymer at a preset temperature.

The method of packaging the optical microresonator array can further include placing the set of optical waveguides 204A proximate to the set of optical fibers 203A so as to optically couple the set of optical fibers to the set of optical waveguides. For example, the set of optical fibers 203A and the set of optical waveguides 204A may be positioned (e.g., by using a high precision positioning system) such that the set of optical waveguides are perpendicular to the optical set of optical fibers (e.g., as described above with respect to FIG. 1). Although the method of packaging the optical microresonator array is primarily described with placement of the optical fiber(s) prior to the optical waveguide(s), it should be understood that in some embodiments, the optical waveguide(s) may be placed prior to the optical fiber(s).

FIG. 2B depicts an exemplary fabrication process of an optical microresonator array (such as the optical microresonator array 100C as described with respect to FIG. 1C). The optical microresonator array may be based on an integrated photonic platform and packaged (e.g., in a polymer structure) to further enhance capabilities of the optical microresonator array, as shown in FIG. 2B. FIG. 2B is a schematic description of an exemplary method of packaging the set of optical fibers 203B and/or the set of integrated photonic waveguides 204B in a structure (e.g., in a polymer structure) to produce a packaged optical microresonator array. The structure can include a backing region 202B (e.g., a backing polymer) and/or a matching region 205B (e.g., a matching polymer). In some embodiments, the backing region 202B and/or the matching region 205B can be layers deposited (e.g., spin coated) on a substrate, as described in further detail below.

The method of packaging the optical microresonator array can include cleaning (e.g., using piranha solution) the surface of a substrate 201B such as, for example, silicon, silica, quartz, plastic, or any other material suitable to serve as a substrate of an acousto-optic sensor device. In some instances, the substrate may be chosen for higher etching rate compared to other materials used in the optical microresonator array, so that it can be etched away to release the optical microresonator array. A suitable material to serve as substrate can include a damping material to eliminate a residual vibration and minimize ultrasound echoes within the sensor structures. With reference to FIG. 2B, the substrate 201B can then be coated with one or more coating materials including the backing polymer 202B. The backing polymer 202B can be a damping material such as, for example, a polymer material with a low refractive index configured to obtain a broad whispering gallery mode (WGM) frequency response in the circumference of the set of optical fibers 203B while having high ultrasound attenuation to prevent reverberation of a set of ultrasound echoes that the optical microresonator array is designed to sense. In some embodiments, acoustic impedance of the damping material of the backing polymer can, for example, match with that of the layer of matching polymer 205B utilized for packaging the optical microresonator array as further described below.

As shown in FIG. 2B, the set of optical waveguides 204B such, for example, a set of integrated photonic waveguides, can be fabricated on top of the substrate 201B. In some embodiments, the set of optical waveguides 204B can be fabricated using lithography techniques from a computer aided design (CAD) pattern. The material of the set of optical waveguides 204B on an integrated photonic platform may include silicon, silicon oxide, silicon nitride, or any material suitable for guiding an optical signal reliably and efficiently. The set of optical waveguides 204B on the integrated photonic platform may receive a set of light from an on-chip light source or a fiber-coupled light source. Moreover, the set of optical waveguides 204B may be configured to couple to other set of integrated photonic components (e.g., beamsplitters, interferometers, multimode interference devices, and/or the like).

In one example, the set of light sources can be a single wavelength fiber-coupled light source emitting single wavelength light into a fiber that is aligned vertically to an on-chip grating coupler. The grating coupler changes the wave vector of the single wavelength light and directs it to an integrated photonic waveguide. The integrated photonic waveguides propagate the single wavelength light to a multimode interference device that splits the single wavelength light into multiple integrated photonic waveguides. The multiple integrated photonic waveguides couple the single wavelength light into the set of optical fibers 203B to propagate a set of WGMs within their circumference and generate a set of optical signals into the multiple integrate photonic waveguide.

In some embodiments, the set of optical waveguides 204B may be deposited or coated with an encapsulation layer 206B which may, for example, improve mechanical stability to the optical microresonator array. Generally, in some embodiments, the encapsulation layer 206B can be the same material as the backing polymer 202B or the matching polymer 205B. The method of packaging the optical microresonator array can further include placing the set of optical fibers 203B proximate to the set of optical waveguides 204B so as to optically couple the set of optical fibers 203B to the set of optical waveguides 204B. For example, the set of optical fibers 203B and the set of optical waveguides 204B may be positioned (e.g., by using a high precision positioning system) such that the set of optical waveguides are aligned perpendicular to the optical set of optical fibers (e.g., as described above with respect to FIG. 1). Although the method of packaging the optical microresonator array is primarily described with placement of the optical waveguide(s) prior to the optical fiber(s), it should be understood that in some embodiments, the optical fiber(s) may be placed prior to the optical waveguide(s).

Examples

Figure 4:
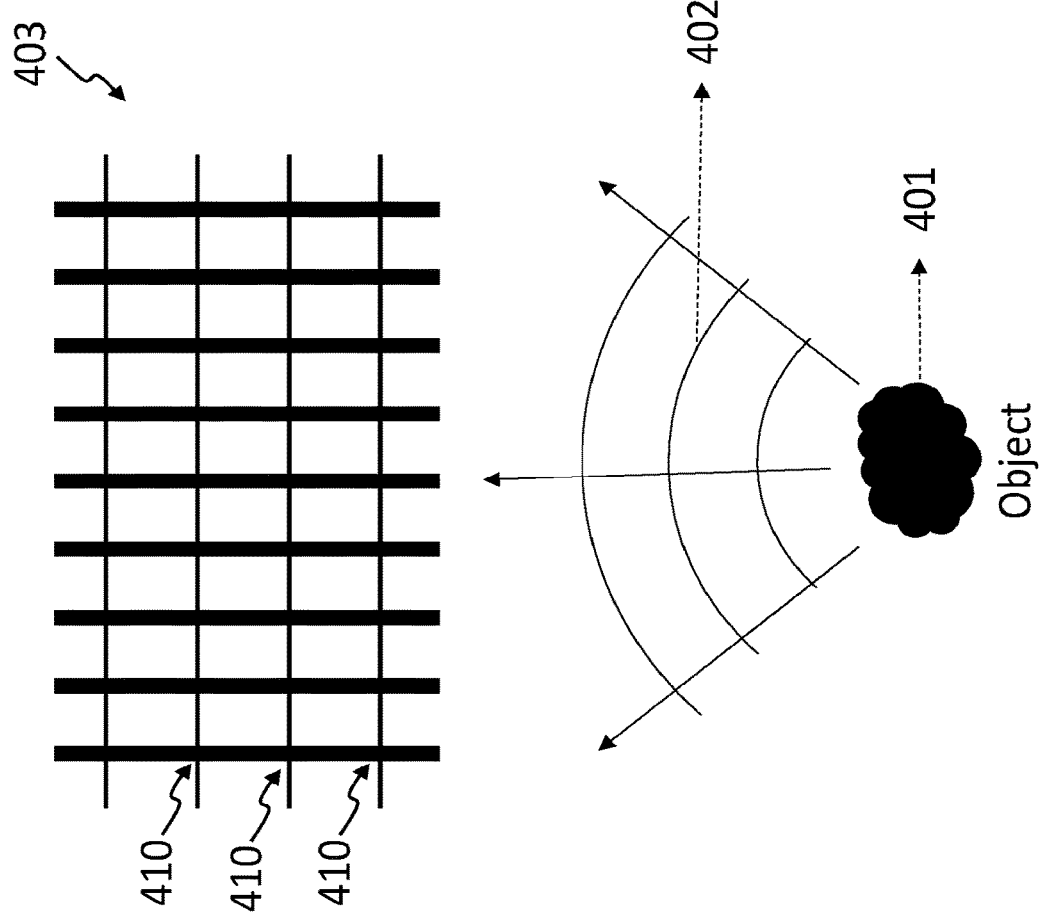
FIG. 4 is a schematic description of an exemplary method of sensing a set of ultrasound echoes using an optical microresonator array device.

Optical microresonator arrays, such as those described herein, may be used in ultrasound sensor devices such as an acousto-optic sensor device. FIG. 4 is a schematic description of sensing ultrasonic echoes using an acousto-optic sensor device 403. The acousto-optic sensor device 403 includes an optical microresonator array including a plurality of resonator nodes 410. Although a set of optical waveguides and a set of optical fibers of the optical microresonator arrays are shown as linearly arranged at a predetermined distance from each other, it should be understood that in some embodiments at least some of the optical waveguides and/or optical fibers may be arranged at different distances from each other. Generally, however, the set of optical waveguides and the set of optical fibers may be arranged in a rectangular grid.

The set of optical waveguides that propagate light from one or more light sources may be optically coupled to the set of optical fibers at resonator nodes at various sensing locations, as described above. Each optical fiber and each optical waveguide in the optical microresonator array may be characterized with a particular cross-sectional geometry, a material uniformity, a particular refractive index of the material from which the optical fiber or the optical waveguide is made, and a refractive index of packaging materials, as described above in further detail with respect to FIG. 2A and FIG. 2B. The light source may be a single wavelength light source, a broadband light source, a tunable laser source, an optical frequency comb (OFC) laser source using either a digital modulating method or using a Kerr four-wave mixing (FWM) method, or any other light source suitable for the operation frequency band of the acousto-optic sensor device 403. The light may be coupled to the optical microresonator array to propagate a first set of whispering gallery modes (WGMs) around the wall of the circumference of the set of optical fibers at a set of resonator nodes 410 where the set of optical fibers and the set of optical waveguide are optically coupled (e.g., intersect). Propagation of the first set of WGMs results in generation of a first set of optical signals corresponding to a first set of resonant frequencies of the WGMs. In some instances, the distance in between the set of optical waveguides is more than five times the wavelength of the light. In some other instances, the distance in between the set of optical fibers is more than three times the wavelength of the light.

In use, the acousto-optic sensor device 403 can be configured to receive a set of ultrasound echoes 402 generated and/or reflected from an object 401. The set of ultrasound echoes may have varying travel times ($t_1$, $t_2$, $t_3$, etc.) to the individual resonator nodes. That is, ultrasound echoes from the same object will reach each sensor in the array at slightly different times. With known distances between each sensor and these measured slight delays, the object's position is better calculated (e.g., with better spatial resolution). The set of ultrasound echoes can induce a set of changes to the geometry, the material uniformity, the refractive index of the material that the optical fiber or the optical waveguide is made from, and/or the refractive index of the packaging materials. The set of changes can introduce changes in the WGMs, e.g., the second set of WGMs, propagating around the wall of the set of optical fibers at the set of resonator nodes of the optical microresonator array. Propagation of the second set of WGMs results in generation of a second set of optical signals corresponding to a second set of resonant frequencies of the WGMs. The first set of optical signals and the second set of optical signals can be configured to propagate in the set of optical waveguides to a set of optical detectors and/or a set of optical spectrum analyzers. The optical detector can be connected to a compute device to detect a difference between the first set of optical signals and the second set of optical signals. In some embodiments, the difference between the first set of optical signals and the second set of optical signals may enable measurement of a change in resonant frequency or frequencies of the set of resonator nodes. In some other embodiments, the difference between the first set of optical signals and the second set of optical signals may additionally or alternatively enable measurement of a change in resonance amplitude of the resonant frequency of the set of resonator nodes.

In some embodiments, the acousto-optic sensor device 403 can be configured to receive a continuum of ultrasound echoes 402 generated and/or reflected from an object 401. The continuum of ultrasound echoes can induce a continuum of changes to the geometry, the material uniformity, and/or the refractive index of the material that the optical fiber or the optical waveguide is made from, and/or the refractive index of the packaging materials. The continuum of changes can introduce a continuum of WGMs, (e.g., the second set of WGMs, a third second set of WGMs, a fourth set of WGMs, and/or the like) propagating around the wall of the set of optical fibers at the set of resonator nodes of the optical microresonator array. Propagation of the continuum of WGMs results in generation of a continuum of optical signals corresponding to a continuum of resonant frequencies of the WGMs. The continuum of optical signals can be configured to propagate in the set of optical waveguides to a set of optical detectors and/or a set of optical spectrum analyzers. The optical detector can be connected to a compute device to detect a continuum of differences between each pair of optical signals from the continuum of optical signals. The continuum of differences may enable measurement of a continuum of changes in resonance amplitude of the resonant frequency of the set of resonator nodes.

Figure 5:
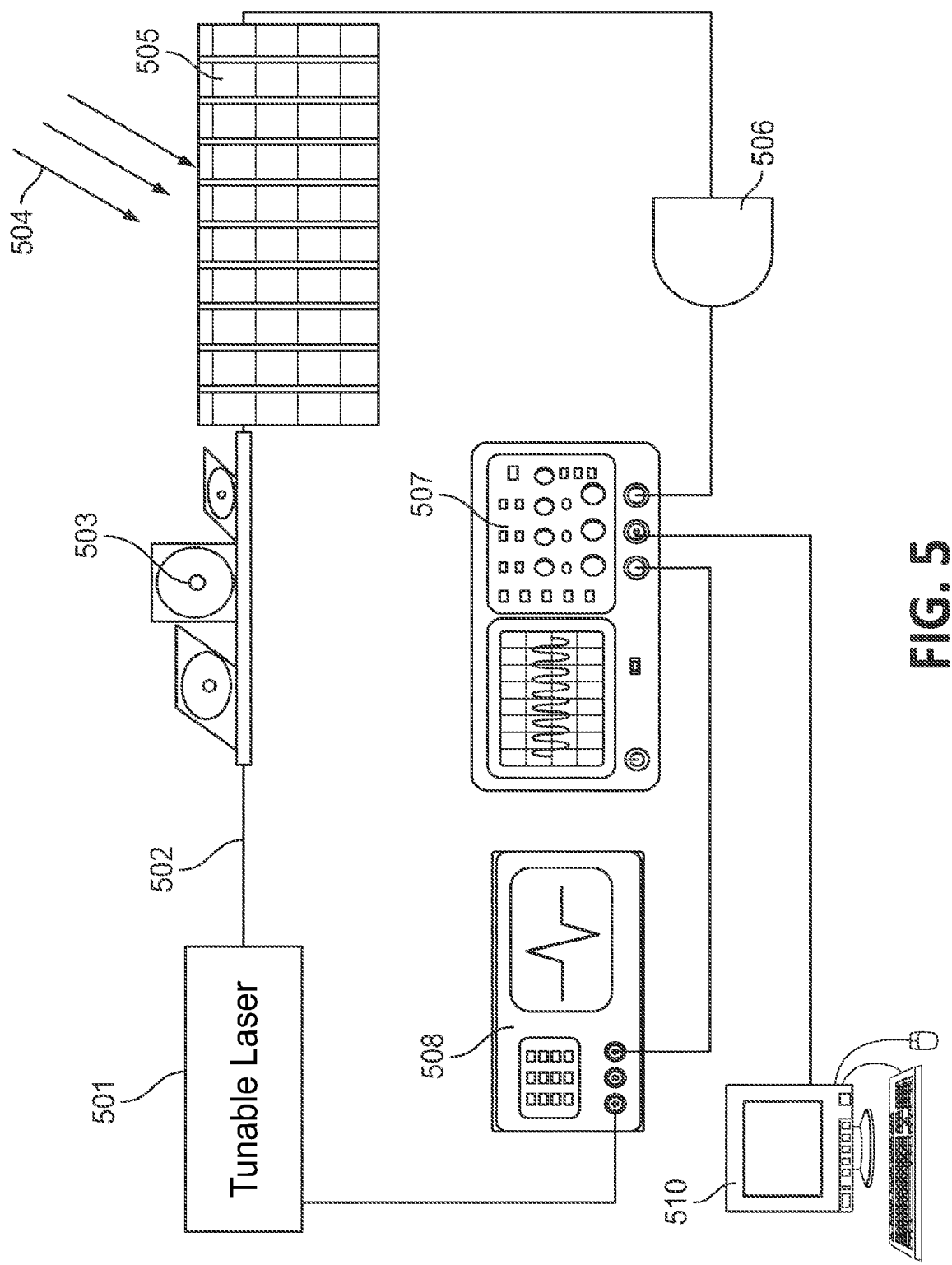
FIG. 5 is a schematic description of an exemplary method of measuring optical response of an optical microresonator array device.

FIG. 5 depicts an exemplary measurement setup that can be used to process a set of signals from an acousto-optic sensor device 505 that senses a set of ultrasonic echoes 504 (also referred to herein as the "ultrasonic signal"). The measurement setup can include a single wavelength light source, a broadband light source, or a tunable laser 501 that propagates a set of lights in an optical fiber 502, a fiber polarization controller 503 that can be configured to control the polarization of the light. The measurement setup can further include an acousto-optic sensor device 505 that can be configured to generate a first set of optical signals based on propagation of a first set of whispering gallery modes (WGMs) in a set of resonator nodes (as described above with respect to FIG. 1A) included in the acousto-optic device 505. The acousto-optic sensor device 505 can be configured to receive a set of ultrasonic signals 504 and generate a second set of optical signals based on propagating a second set of WGMs in set of resonator nodes. The acousto-optic sensor device 505 can be configured further to transmit the first set of optical signals and/or the second set of optical signals to the optical fiber 502. The measurement setup can further include a photodetector (also referred to herein as "an optical detector") 506 that receives the first set of optical signals and/or the second set of optical signals and converts them to a first set of electrical signals and/or a second set of electrical signals. The photodetector 506 can be configured further to transmit the first set of electrical signals and/or the second set of electrical signals to an oscilloscope 507 operatively connected to a computer device 510 to process and analyze the first set of signals and/or the second set of signals. The oscilloscope 507 can be configured further to transmit a set of analyzed signals to a function generator 508. The function generator can be configured to generate and transmit a set of generation signals to the broadband light source or the tunable laser 501 to control propagation of light in the optical fiber 502.

In another exemplary measurement setup, the function generator 508 in FIG. 5 could be replaced by a locking system, such as a Pound-Drever-Hall (PDH) locking system, to set the wavelength of the light source on the resonance slope of the WGM. The photodetector 506 will receive oscillating optical signals in response to a set of ultrasonic echoes.

Figure 6:
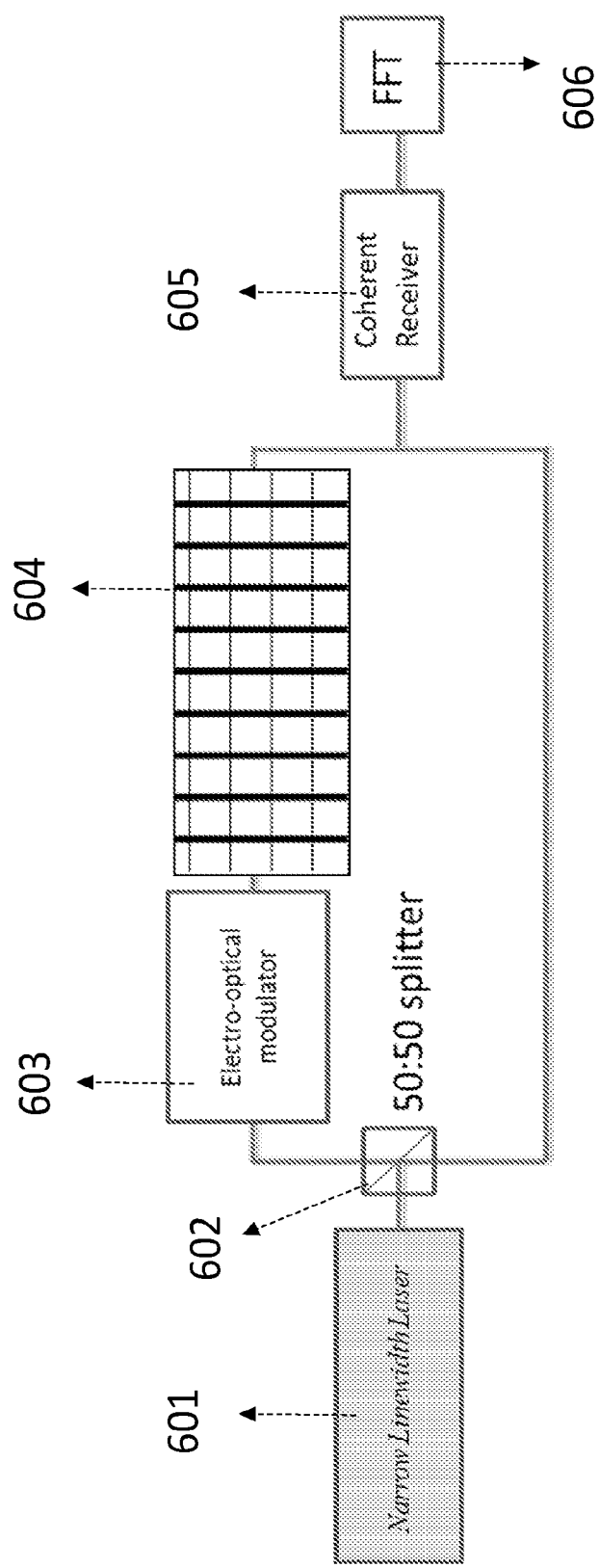
FIG. 6 is a schematic description of an exemplary method of measuring optical response of an optical microresonator array device.

FIG. 6 depicts an exemplary measurement setup that can be used to process a set of signals from an acousto-optic sensor device 604 that senses a set of ultrasonic echoes. The measurement setup can include a laser 601 such as, for example, an optical frequency comb (OFC) laser source generated using either a digital modulating method or using a Kerr four-wave mixing (FWM) method, or any other laser suitable for the operation frequency band of the acousto-optic sensor device 604, to generate a laser light. The measurement setup can further include a beamsplitter 602 such as, for example, a 50:50 beamsplitter, an 80:20 beamsplitter, or any other beamsplitters suitable for the measurement setup. The beam splitter can be configured to split the laser light to a first laser light and a second laser light. The measurement setup can be configured to direct the first laser light to an electro-optical modulator 603 to generate and transmit a modulated laser light. The measurement setup can be configured further to direct the modulated laser light to the acousto-optic sensor device 604 to generate a first set of signals corresponding to a first set of whispering gallery modes (WGMs). The acousto-optic sensor device 604 can be configured to receive a set of ultrasound signals and generate a second set of signals corresponding to a second set of WGMs. The measurement setup can be configured further to direct the first set of signals, the second set of signals, and/or the second laser light to a coherent receiver 605 to mix the second laser light with the first set of signals and/or the second set of signals and generate an electronic frequency signal. The measurement setup can be configured to transmit the electronic frequency signal to a Fast Fourier Transformation (FFT) module 606 operatively connected to a compute device to process and analyze a difference between the first set of signals and the second set of signals. In one example, the OFC laser can generate a set of comb beams, and each comb beam from the set of comb beams can generate a data point to detect the difference between the first set of signals and the second set of signals. In this example one set of comb beams can generate a set of data points corresponding to the set of comb beams. In some embodiments, use of an OFC laser source can advantageously reduce sensing time from milliseconds to a sensing time on the order of microseconds.

Although in the examples above the optical microresonator array has been used for ultrasound detection, in some embodiments, the optical microresonator array may be used for nanoparticle detection, biomolecule detection, and/or the like. In some instances, by exposing the set of resonator nodes to nanoparticles and/or biomolecules, the environment surrounding the resonator nodes at intersection of the set of optical fibers and the set of optical waveguides can change. The change of the environment can result in change of propagating whispering gallery modes (WGMs) at the set of resonator nodes and generate a second WGMs. A change between a first set of optical signals associated the first WGMs and a second set of optical signals associated with the second WGMs may be detected by a photodetector and/or an optical spectrum analyzer.

In some embodiments, an optical microresonator array such as those described herein may be included in an ultrasound probe (also referred to herein as "ultrasound system"). The ultrasound probe can include at least one optical waveguide to propagate a light. The ultrasound probe can further include multiple piezoelectric elements to generate a set of ultrasound signals. The ultrasound probe can further include multiple piezoelectric elements to receive a set of ultrasound echoes corresponding to the set of ultrasound signals. The ultrasound probe can further include a set of resonator nodes in a polymer structure. Each resonator node having a preassigned sensing location at an intersection of an optical waveguide and an optical fiber. Each resonator node configured to receive multiple ultrasound echoes and propagate a set of whispering gallery modes (WGMs). The set of optical fibers are coupled to the set of optical waveguides at the set of resonator nodes such that the set of optical fibers are configured to communicate to the set of optical waveguides a first set of signals corresponding to the first set of WGMs.

Figure 7:
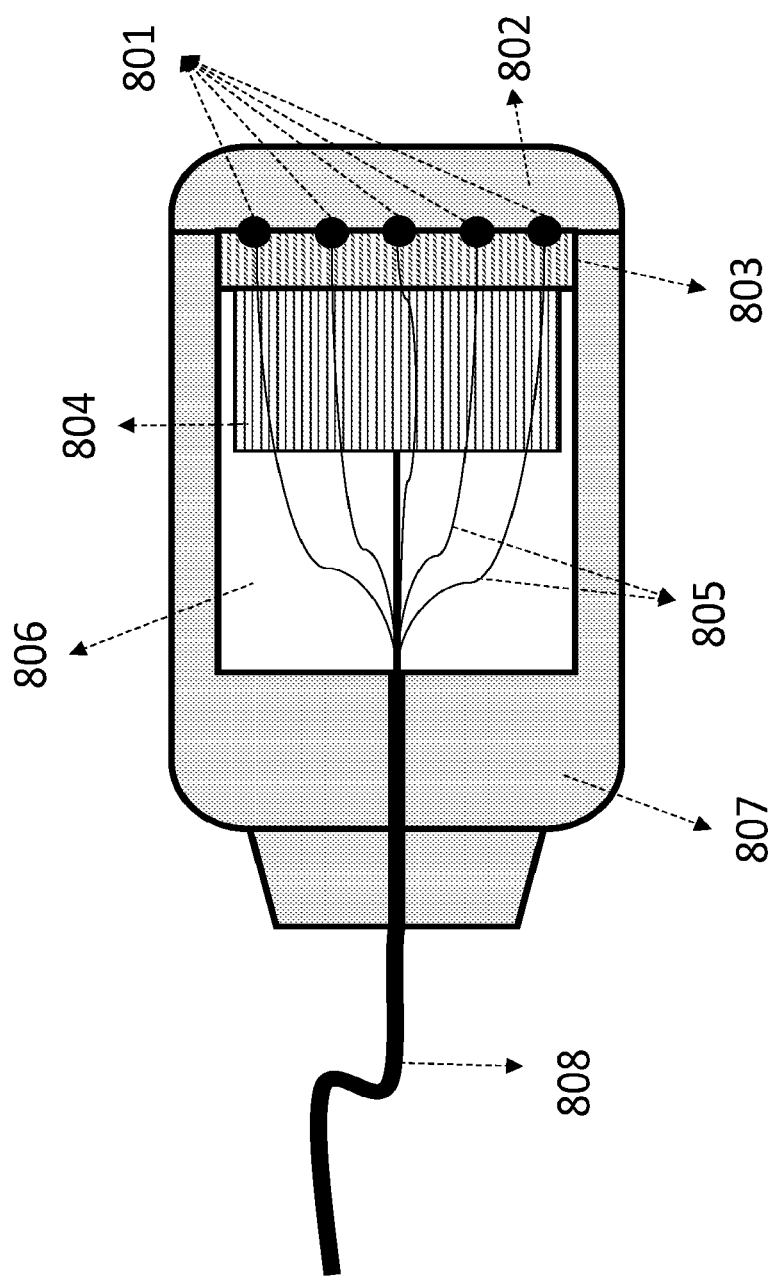
FIGS. 7 and 8 are schematic descriptions of an exemplary ultrasound probe.
Figure 8:
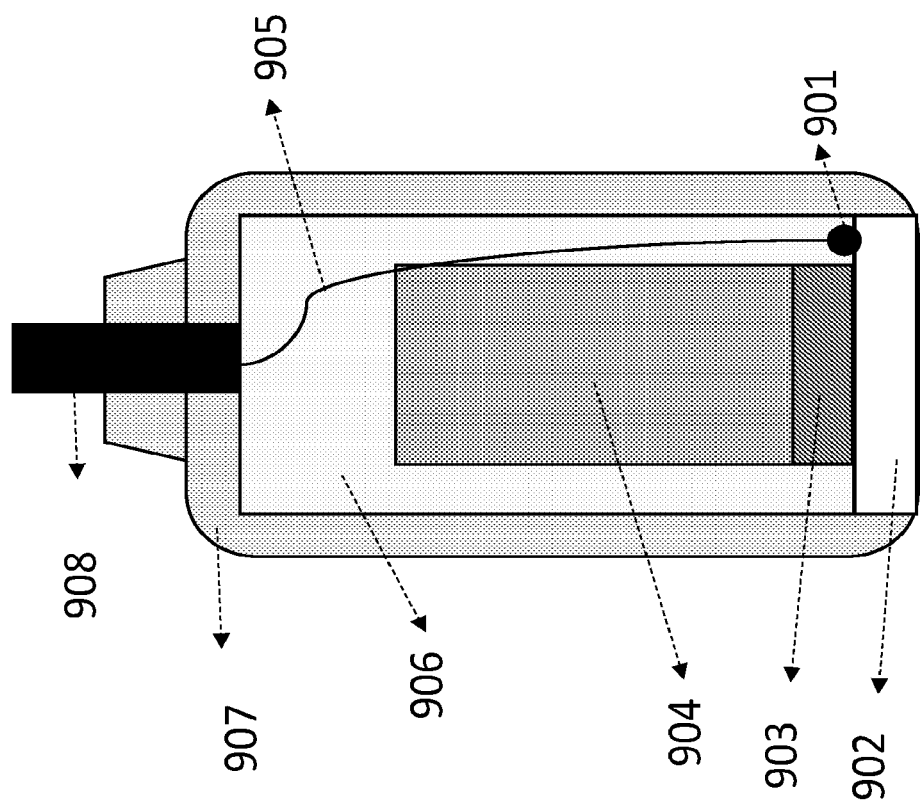

For example, FIG. 7 is a schematic description of an ultrasound probe, utilizing optical microresonator arrays such as those described herein. FIG. 8 is a cross-sectional view of the probe depicted in FIG. 7. The ultrasound probe can include an optical microresonator array 801, a matching layer 802, a piezoelectric crystal array 803, an electrical connection array 804, a set of optical fibers 805, a backing material 806, an acoustic insulator 807, and a cable 808 connected to an ultrasound data acquisition. The ultrasound probe can be coupled to a control system, and a display, to perform an operation procedure as described in further detail herein. The backing material can include a damping material bonded to the back of the package of the probe to eliminate residual vibrations of operation environment, to improve portability, and to minimize echoes generated within the sensor structure.

The ultrasound probe can be configured to propagate light from a light source to the set of optical microresonator array 801 to generate a first set of optical signals corresponding to a first set of WGMs propagating in each optical fiber at a resonator node of the optical microresonator array 801. The piezoelectric crystal array 803 can be configured to receive an electrical signal from the control system via the cable 808 and the electrical connection array 804 to generate a set of ultrasound signals towards an object such that a set of reflected ultrasound echoes are generated in a direction toward the ultrasound probe. The ultrasound probe can be configured further to generate a second set of optical signals corresponding to a second set of WGMs in the optical microresonator array 801, after receiving the set of ultrasound echoes. The ultrasound probe can be optionally configured to receive the set of ultrasound echoes to generate a set of electrical signals. The ultrasound probe can be configured further to transmit the first set of signals and/or the second set of signals via the set of optical fibers 805, and/or optionally transmit a set of electrical signals via the electrical connection array 804 to the cable 808 connected to the ultrasound data acquisition, the control system, or the display.

In some embodiments, the ultrasound probe can be configured to repeat the operation procedure while scanning across a field of view by using a phased array of the piezoelectric crystal array. Doing so, will yield a line-by-line image using the piezoelectric crystal array and one low-resolution image in a lateral direction, for each resonator node. Known Synthetic Aperture (SA) algorithms can then be used to generate a high-resolution optical microresonator array sensor image.

Furthermore, in some embodiments, one or more of the piezoelectric elements can be configured to receive ultrasound echoes corresponding to the set of transmitted ultrasound signals, and generate sensor signals based on these received ultrasound echoes. For example, the sensor signals generated by the piezoelectric elements may supplement or be combined with the signals communicated by the resonator nodes in any suitable manner (e.g., to provide a multi-modal sensor image).

Additionally or alternatively, in some embodiments, the ultrasound probe can be configured to use different patterns of excitation such as, for example, using a piezoelectric crystal element or a group of piezoelectric crystals to transmit the ultrasound signal, while using all piezoelectric crystal elements in the piezoelectric crystal array to receive the set of ultrasound echoes, also known as Compressed Sensing (CS) method. The general approach of CS method is to form a linear model that represents the process of signal acquisition from an image (also known as a forward model) and to solve the linear equation to get the image.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. An apparatus comprising:
   a plurality of optical fibers;
   a plurality of optical waveguides; and
   a plurality of resonator nodes arranged in an array of sensing locations, each resonator node comprising an optical coupling between an optical waveguide and an optical fiber, the plurality of optical fibers having a set of resonant frequencies at a respective sensing location, one or more light sources configured to emit one or more light inputs into the plurality of optical waveguides coupled to the plurality of optical fibers, the one or more light inputs exciting a set of whispering gallery modes at the plurality of resonator nodes to propagate along corresponding circumferences of the plurality of optical fibers, wherein each resonator node is configured to communicate a set of signals corresponding to at least one shift in the set of resonant frequencies induced by ultrasound echoes in the optical fiber at the respective sensing location.

2. The apparatus of claim 1, wherein the plurality of optical fibers are configured to:

receive a plurality of ultrasound echoes; and experience the at least one shift in the set of resonant frequencies in response to the plurality of ultrasound echoes, wherein the plurality of optical waveguides are configured to propagate a set of signals corresponding to the at least one shift in the set of resonant frequencies to an optical detector.

3. The apparatus of claim 1, wherein the plurality of optical waveguides comprise a tapered optical fiber or an integrated photonic waveguide.

4. The apparatus of claim 1, wherein the plurality of optical fibers are in a polymer structure.

5. The apparatus of claim 1, wherein the plurality of optical fibers and the plurality of optical waveguides are in a polymer structure.

6. The apparatus of claim 1, wherein the plurality of optical waveguides are oriented substantially perpendicular to the plurality of optical fibers.

7. A method of ultrasound sensing comprising:

providing a plurality of optical fibers and a plurality of optical waveguides arranged to form a plurality of resonator nodes, each resonator nodes comprising an optical coupling between an optical waveguide and an optical fiber;

exciting a first set of whispering gallery modes, via one or more light inputs emitted from one or more light sources into the plurality of optical waveguides coupled to the plurality of optical fibers, the one or more light inputs propagating along corresponding circumferences of the plurality of optical fibers;

receiving at the plurality of optical waveguides, via the plurality of resonator nodes, a first set of signals corresponding to the first set of whispering gallery modes propagating along the corresponding circumferences of the plurality of optical fibers;

receiving at the plurality of optical waveguides, via the plurality of resonator nodes, a second set of signals corresponding to a second set of whispering gallery modes propagating along the corresponding circumferences of the plurality of optical fibers, the second set of whispering gallery modes propagating in response to the plurality of optical fibers receiving a plurality of ultrasound echoes; and detecting a set of differences between the first set of signals and the second set of signals.

8. The method of claim 7, further comprising calculating a magnitude of each ultrasound echo at each resonator node based at least in part on the set of differences between the first set of signals and the second set of signals; and associating the magnitude of each ultrasound echo to a sensing location of each resonator node.

9. The method of claim 7, the plurality of optical waveguides configured to propagate at least one of the first set of signals and the second set of signals to an optical detector.

10. The method of claim 7, further comprising:

transmitting a plurality of ultrasound signals to a target; and receiving the plurality of ultrasound echoes from the target corresponding to the plurality of ultrasound signals at the plurality of optical fibers, the plurality of optical fibers configured to perform a synthetic aperture (SA) operation or a compressed sensing (CS) operation.

11. The method of claim 7, wherein the plurality of optical waveguides comprise a plurality of tapered optical fibers or a plurality of integrated photonic waveguides.

12. The method of claim 7, wherein the plurality of optical fibers are in a polymer structure.

13. The method of claim 12, wherein the plurality of optical fibers and the plurality of optical waveguides are in a polymer structure.

14. The method of claim 7, wherein the plurality of optical waveguides are aligned to the plurality of optical fibers to excite the first set of whispering gallery modes or the second set of whispering gallery modes in the plurality of optical fibers.

15. An apparatus comprising:

a plurality of optical fibers, each optical fiber configured to propagate a set of whispering gallery modes along a circumference of a corresponding optical fiber, and a plurality of optical waveguides optically coupled to the plurality of optical fibers to form a plurality of resonator nodes, one or more light sources emitting one or more light inputs into the plurality of optical waveguides coupled to the plurality of optical fibers, the one or more light inputs exciting the set of whispering galley modes at the plurality of resonator nodes, the plurality of optical fibers communicating to the plurality of optical waveguides a set of signals corresponding to the set of whispering gallery modes, wherein the plurality of optical waveguides are configured to propagate the set of signals to at least one optical detector.

16. The apparatus of claim 15, wherein the plurality of optical fibers are configured to:

receive a plurality of ultrasound echoes;

propagate a second set of whispering gallery modes in response to the plurality of ultrasound echoes; and communicate to the plurality of optical waveguides a second set of signals corresponding to the second set of whispering gallery modes, wherein the plurality of optical waveguides are configured to propagate the second set of signals to the at least one optical detector.

17. The apparatus of claim 16, wherein the set of whispering gallery modes is a first set of whispering gallery modes, and wherein the plurality of optical fibers are configured to communicate, through the plurality of resonator nodes, to the plurality of optical waveguides a set of signals corresponding to a difference between the first set of whispering galley modes and the second set of whispering gallery modes.

18. The apparatus of claim 17, wherein the difference between the first set of whispering gallery modes and the second set of whispering gallery modes is at least one of: at least one shift in a resonant frequency of an optical fiber and an attenuation of a resonance of the plurality of optical fibers.

19. The apparatus of claim 15, wherein the plurality of optical fibers are in a polymer structure.

20. The apparatus of claim 19, wherein the plurality of optical fibers and the plurality of optical waveguides are in a polymer structure.

21. An apparatus comprising:
a optical fiber;
a plurality of optical waveguides; and
a plurality of resonator nodes arranged in an array of sensing locations, each resonator node comprising an optical coupling between an optical waveguide and the optical fiber, the optical fiber having a set of resonant frequencies at a respective sensing location, one or more light sources configured to emit one or more light inputs into the plurality of optical waveguides coupled to the optical fiber, the one or more light inputs exciting a set of whispering gallery modes at the plurality of resonator nodes to propagate along corresponding circumferences of the optical fiber at respective sensing locations,
wherein each resonator node is configured to communicate a set of signals corresponding to at least one shift in the set of resonant frequencies induced by ultrasound echoes in the optical fiber at the respective sensing location.

22. An apparatus comprising:
a plurality of optical fibers;
an optical waveguide; and
a plurality of resonator nodes arranged in an array of sensing locations, each resonator node comprising an optical coupling between the optical waveguide and an optical fiber, the plurality of optical fibers having a set of resonant frequencies at a respective sensing location, a light source configured to emit a light input into the optical waveguide coupled to the plurality of optical fibers, the light input exciting a set of whispering gallery modes at the plurality of resonator nodes to propagate along corresponding circumferences of the plurality of optical fibers,
wherein each resonator node is configured to communicate a set of signals corresponding to at least one shift in the set of resonant frequencies induced by ultrasound echoes in the optical fiber at the respective sensing location.

* * * * *